US012809225B2

(12) United States Patent
Hadij El Houati et al.

(10) Patent No.: US 12,809,225 B2
(45) Date of Patent: Nov. 24, 2026

(54) SINGLE-BEAM SIDE DEFLECTOR, MULTIPLEXER/DEMULTIPLEXER AND OPTICAL ANTENNA FEEDER INCORPORATING THE DEFLECTOR, AND METHODS THAT USE SAME

(71) Applicant: UNIVERSIDAD DE MÁLAGA, Málaga (ES)

(72) Inventors: Abdelfettah Hadij El Houati, Málaga (ES); Íñigo Molina Fernández, Málaga (ES); Juan Gonzalo Wanguemert Pérez, Málaga (ES); Alejandro Ortega Moñux, Málaga (ES); Robert Halir, Málaga (ES)

(73) Assignee: UNIVERSIDAD DE MÁLAGA, Málaga (ES)

( * ) Notice: Subject to any disclaimer, the term of this patent is extended or adjusted under 35 U.S.C. 154(b) by 747 days.

(21) Appl. No.: 18/039,828

(22) PCT Filed: Dec. 1, 2021

(86) PCT No.: PCT/ES2021/070865

§ 371 (c)(1),
(2) Date: Jul. 6, 2023

(87) PCT Pub. No.: WO2022/117902

PCT Pub. Date: Jun. 9, 2022

(65) Prior Publication Data

US 2024/0004261 A1 Jan. 4, 2024

(30) Foreign Application Priority Data

Dec. 2, 2020 (ES) ............................... ES202031204

(51) Int. Cl.
*G02F 1/31* (2006.01)
*G02F 1/313* (2006.01)

(52) U.S. Cl.
CPC ........ *G02F 1/313* (2013.01); *G02F 2201/305* (2013.01); *G02F 2202/30* (2013.01)

(58) Field of Classification Search
CPC . G02F 1/313; G02F 2201/305; G02F 2202/30
See application file for complete search history.

(56) References Cited

U.S. PATENT DOCUMENTS

| | | | | |
|---|---|---|---|---|
| 5,937,113 A * | 8/1999 | He | G01J 3/02 | 385/11 |
| 6,339,662 B1 * | 1/2002 | Koteles | G02B 6/12019 | 385/24 |

(Continued)

FOREIGN PATENT DOCUMENTS

| | | |
|---|---|---|
| WO | 2007061986 A1 | 5/2007 |
| WO | 2011101632 A1 | 8/2011 |

OTHER PUBLICATIONS

Bock et al., Demonstration of a curved sidewall grating demultiplexer on silicon, Opt. Express 20, 19882-19892 (2012) (Year: 2012).*

(Continued)

*Primary Examiner* — Peter Radkowski
(74) *Attorney, Agent, or Firm* — Umberg Zipser-LLP; Ryan Dean

(57) ABSTRACT

The invention relates to single-beam side deflectors with effective refractive indexes of respective channel and target film waveguides, a refractive index of the cladding and substrate, and a periodicity Λ of the channel waveguide that satisfy the single-beam diffraction conditions. The invention also relates to wavelength multiplexers/demultiplexers, optical antenna feeders, and methods which use all of them.

20 Claims, 16 Drawing Sheets

(56) References Cited

U.S. PATENT DOCUMENTS

| | | | | |
|---|---|---|---|---|
| 6,766,077 | B2 * | 7/2004 | Packirisamy | G02B 6/124 385/24 |
| 6,798,948 | B2 * | 9/2004 | Delisle | G02B 6/12004 385/47 |
| 7,058,263 | B2 * | 6/2006 | Welch | G02B 6/12033 385/24 |
| 7,272,276 | B2 * | 9/2007 | Pearson | G02B 6/29326 385/44 |
| 7,376,308 | B2 * | 5/2008 | Cheben | G02B 6/425 385/47 |
| 7,447,403 | B2 * | 11/2008 | Kirk | G02B 6/2938 385/37 |
| 7,680,371 | B2 * | 3/2010 | Cheben | G02B 6/14 385/124 |
| 8,098,968 | B2 | 1/2012 | Green et al. | |
| 8,285,149 | B2 | 10/2012 | Bai | |
| 8,351,043 | B2 * | 1/2013 | Cheben | G01J 3/02 356/454 |
| 8,873,961 | B2 * | 10/2014 | Luo | G02B 6/2931 398/79 |
| 8,923,672 | B2 * | 12/2014 | Bernasconi | H04J 14/0204 385/37 |
| 9,316,788 | B2 * | 4/2016 | Witzens | G02B 6/13 |
| 9,369,201 | B2 * | 6/2016 | Luo | H04B 10/0775 |
| 9,476,981 | B2 | 10/2016 | Yaacobi et al. | |
| 9,513,437 | B2 * | 12/2016 | Zhang | G02B 6/134 |
| 9,964,833 | B2 | 5/2018 | Eldada | |
| 10,191,145 | B2 | 1/2019 | Swanson | |
| 10,254,477 | B2 * | 4/2019 | Mahgerefteh | G02B 6/105 |
| 10,495,813 | B2 * | 12/2019 | Mahgerefteh | G02B 6/12016 |
| 10,656,496 | B2 | 5/2020 | Hashemi et al. | |
| 2001/0033714 | A1 * | 10/2001 | Delisle | G02B 6/1203 385/33 |
| 2003/0048498 | A1 * | 3/2003 | Pearson | H04B 10/077 398/5 |
| 2003/0063849 | A1 * | 4/2003 | Janz | G02B 6/12023 385/27 |
| 2003/0068113 | A1 * | 4/2003 | Janz | G02B 6/12007 385/11 |
| 2003/0091282 | A1 * | 5/2003 | Packirisamy | G02B 6/124 359/569 |
| 2004/0240063 | A1 * | 12/2004 | Delage | G02B 6/12007 430/5 |
| 2005/0141808 | A1 * | 6/2005 | Cheben | G02B 6/122 385/37 |
| 2005/0201669 | A1 * | 9/2005 | Welch | G02B 6/12019 385/14 |
| 2007/0086703 | A1 * | 4/2007 | Kirk | G02B 6/12007 385/24 |
| 2008/0193079 | A1 * | 8/2008 | Cheben | G02B 6/14 385/28 |
| 2008/0193080 | A1 * | 8/2008 | Cheben | G02B 6/14 385/124 |
| 2010/0110443 | A1 * | 5/2010 | Cheben | G02B 6/4215 356/454 |
| 2013/0039661 | A1 * | 2/2013 | Luo | G02B 6/2931 359/566 |
| 2013/0121695 | A1 * | 5/2013 | Bernasconi | H04J 14/0204 398/49 |
| 2013/0209112 | A1 * | 8/2013 | Witzens | G02B 6/2813 385/14 |
| 2014/0029940 | A1 * | 1/2014 | Luo | H04B 10/0775 398/38 |
| 2014/0169737 | A1 * | 6/2014 | Zheng | G02B 6/4215 385/37 |
| 2016/0124251 | A1 * | 5/2016 | Zhang | G02F 1/2257 438/31 |
| 2017/0023736 | A1 | 1/2017 | Bauters et al. | |
| 2017/0045689 | A1 * | 2/2017 | Zhang | G02B 6/12007 |
| 2017/0168237 | A1 * | 6/2017 | Mahgerefteh | G02B 6/126 |
| 2017/0371227 | A1 | 12/2017 | Skirlo et al. | |
| 2019/0018196 | A1 * | 1/2019 | Trita | G02B 6/29355 |
| 2019/0041578 | A1 * | 2/2019 | Mahgerefteh | G02B 6/12016 |

OTHER PUBLICATIONS

Cheben et al., Subwavelength waveguide grating for mode conversion and light coupling in integrated optics, Opt. Express 14, 4695-4702 (2006) (Year: 2006).*

Cheben et al., Subwavelength integrated photonics. Nature 560, 565-572 (2018). https://doi.org/10.1038/s41586-018-0421-7 (Year: 2018).*

Hadij-ElHouati et al., Distributed Bragg deflector coupler for on-chip shaping of optical beams, Opt. Express 27, 33180-33193 (2019) (Year: 2019).*

Halir et al., Waveguide sub-wavelength structures: a review of principles and applications, Laser Photonics Rev. 9, No. 1, 25-49 (2015) / DOI 10.1002/lpor.201400083 (Year: 2015).*

Halir et al., Subwavelength-grating metamaterial structures for silicon photonic devices, Proc. IEEE 106(12), 2144-2157 (2018). (Year: 2018).*

Hao et al., Novel dispersive and focusing device configuration based on curved waveguide grating (CWG), Opt. Express 14, 8630-8637 (2006) (Year: 2006).*

Melati et al., Athermal echelle grating filter in silicon-on-insulator using a temperature-synchronized input, Opt. Express 26, 28651-28660 (2018) (Year: 2018).*

Melati et al., Compact and Low Crosstalk Echelle Grating Demultiplexer on Silicon-On-Insulator Technology. Electronics Aug. 2019, 687. https://doi.org/10.3390/electronics8060687 (Year: 2019).*

Wu et al., Side-mode suppressed filter based on an angular grating-subwavelength grating microring resonator with high flexibility in wavelength design, Appl. Opt. 58, 7174-7180 (2019) (Year: 2019).*

Čtyroký et al., Design of narrowband Bragg spectral filters in subwavelength grating metamaterial waveguides, Opt. Express 26, 179-194 (2018) (Year: 2018).*

Hadij-Elhouati A et al: "Diffractive sidewall grating coupler: towards 2D free-space optics on chip", Proceedings of SPIE, Apr. 26, 2019; 11031:110310R-1-110310R-9.

Zhang et al., "Large-scale integrated reconfigurable orbital angular momentum mode multiplexer," arxiv.org, Cornell University Library, 201 Olin Library Cornell University Ithaca, NY 14853, Aug. 3, 2020; 8 pgs.

Abediasl et al., "Monolithic optical phased-array transceiver in a standard SOI CMOS process," Optics Express, Mar. 9, 2015; 23(5):6509-6519.

Bock et al., "Demonstration of a curved sidewall grating demultiplexer on silicon," Optics Express, Aug. 27, 2012; 20(18):19882-19892.

Bock et al., "Demultiplexer with blazed waveguide sidewall grating and sub-wavelength grating structure," Optics Express, Oct. 27, 2008; 16(22):17616-17625.

Davis, et al., "Distributed Bragg Deflectors Fabricated in Sol-Gel Based Waveguides," IEEE Photonics Technolog Letters, Feb. 2004; 16(2):464-466.

Dragone, C., "Efficient N×N Star Couplers Using Fourier Optics," Journal of Lightwave Technology, Mar. 1989; 7(3):479-489.

Hadij-Elhouati, et al., "Distributed Bragg deflector coupler for on-chip shaping of optical beams," Optics Express, Nov. 11, 2019; 27(23):33190-33193.

Halir et al., "High performance silicon photonic devices based on practical metamaterials," Jul. 7, 2019; 2019 24th Optoelectronics and Communications Conference (OECC) and 2019 International Conference on Photonics In Switching and Computing (PSC), Jul. 7, 2019 The Institute of Electronics, Information and Communication Engineers (IEICE); pp. 1-3.

Heck, Martijn J.R., "Highly integrated optical phased arrays: photonic integrated circuits for optical beam shaping and beam steering," Nanophotonics, 2016; 16 pgs.

International Search Report for International Application No. PCT/ES2021/070865 dated Jan. 19, 2022; 5 pgs.

(56) References Cited

OTHER PUBLICATIONS

International Search Report for International Application No. PCT/ES2021/070865 dated Jan. 19, 2022; English translation, 2 pgs.
Kim et al., "Photonic waveguide to free-space Gaussian beam extreme mode converter," Light: Science & Applications, 2018; 7:72; 13 pgs.
Masood et al., "Comparison of heater architectures for thermal control of silicon photonic circuits," IEEE, 2013; 2 pgs.
Melati et al., "Athermal echelle grating filter in silicon-on-insulator using a temperature-synchronized input," Optics Express, Oct. 29, 2018; 26(22):28651-28660.
Okamoto, Katsunari, "Wavelength-Division-Multiplexing Devices in Thin SOI: Advances and Prospects," IEEE Journal of Selected Topics in Quantum Electronics, Jul./Aug. 2014; 20(4); 10 pgs.
Poulton et al., "Coherent solid-state LIDAR with silicon photonic optical phased arrays," Optics Letters, Oct. 15, 2017, 42(20):4091-4094.
Srinivasan, et al., "56Gb/s Germanium Waveguide Electro-Absorption Modulator," Journal of Lightwave Technology, 2015; 6 pgs.
Stoll, H.M., "Distributed Bragg deflector: a multifunctional integrated optical device," Applied Optics, Aug. 15, 1978; 17(16):2562-2569.
Tondini et al., "Methods for low crosstalk and wavelength tunability in arrayed-waveguide grating for on-silicon optical network," Journal of Lightwave Technology, 2017; 9 pgs.
Wang et al., "Athermal arrayed waveguide gratings in silicon-on-insulator by overlaying a polymer cladding on narrowed arrayed waveguides," Applied Optics, Mar. 20, 2012; 51(9):1251-1256.
Written Opinion for International Application No. PCT/ES2021/070865 dated Jan. 19, 2022; 5 pgs.
Written Opinion for International Application No. PCT/ES2021/070865 dated Jan. 19, 2022; English translation, 5 pgs.
Xie et al., "Thermally-reconfigurable Silicon Photonic Devices and Circuits," IEEE Journal of Selected Topics in Quantum Electronics, 2020; 21 pgs.
Yang et al., "Thermo-Optically Tunable Silicon AWG With Above 600 GHz Channel Tunability," IEEE Photonics Technology Letters, Nov. 15, 2015; 27(22):2351-2354.
Yepez et al., "Novel Measures for Thermal Management of Silicon Photonic Optical Phased Arrays," Aug. 2019; 11(4); 16 pgs.

* cited by examiner a)

b)

SINGLE-BEAM SIDE DEFLECTOR, MULTIPLEXER/DEMULTIPLEXER AND OPTICAL ANTENNA FEEDER INCORPORATING THE DEFLECTOR, AND METHODS THAT USE SAME

TECHNICAL FIELD

The present invention relates to the field of integrated optics, and more specifically to devices based on lateral diffraction gratings.

BACKGROUND OF THE INVENTION

Integrated optical circuits are miniaturized optical systems made up of several components which are manufactured in wafers using deposition, material growth, and lithographic techniques similar to those used in microelectronics. Channels are manufactured in the wafer by means of these techniques, said channels being formed by materials with different dielectric constants (waveguides) which allow light to be conducted and manipulated by the plane of the wafer with low optical power losses. These optical waveguides are the fundamental components on which integrated optical circuits are built.

Depending on whether they provide one-dimensional or two-dimensional confinement, waveguides are divided into: channel waveguides (with two-dimensional confinement) which allow light to be conducted by taking it from one point to another inside the wafer, and film waveguides (one-dimensional confinement) which allow light to be confined on the plane of the wafer but allowing a light beam to be freely propagated in any direction within the film.

The design of integrated optical circuits is based on the suitable combination of a set of basic blocks interconnected to one another that allow a desired functionality to be performed. Among the most common basic blocks are couplers, which are devices that allow the manipulation of the shape of the light, allowing the transfer thereof between different waveguides or between a waveguide and the space outside the chip. There are various types of couplers, including: power dividers, directional couplers, multimode interference couplers, mode size converters, chip-to-fiber couplers, chip-to-free space couplers [1], the star couplers [2], or deflectors [3], [4]. The couplers are part of most of the integrated optical subsystems such as modulators, receivers, demultiplexers, or filters and, therefore, are components of great practical application in many applications.

The deflector proposed in [3] consists of a channel guide defined within a film guide. A diffraction grating is etched on the channel guide, and it laterally deflects the guided mode into a beam propagated through the film guide making use of the known physical principle of 'phase matching' or 'momentum matching', which allows using any of the non-zero orders of diffraction of the structure in order to achieve the desired coupling. A limitation of this device is that for its efficient operation, the effective refractive index of the film guide must be less than the effective refractive index of the guided mode through the channel guide. This is because an undesired power coupling through the zero order of diffraction would otherwise occur, which would limit the efficiency of the device. Document [4] shows experimental evidence of this type of device on a sol-gel technology, but it has the same limitations mentioned for the device proposed in [3]. The problem with these configurations is that they cannot be carried out directly for situations in which the optical power is desired to be laterally deviated from a channel guide to a film guide having an effective refractive index that is greater than that of the guided mode, because in that case the efficiency of the device would be considerably reduced due to power leakages through the non-zero order of diffraction.

Documents [5],[6] proposed a new type of side deflector based on subwavelength grating (SWG) technology which allows transferring power from a channel guide mode to a beam which propagates through a film guide the refractive index of which is greater than that of the guided mode, which occurs in silicon-on-insulator (Sol) technology. Although in these papers the deflector is located on a circle in a configuration which focuses said beam and is used for wavelength multiplexing/demultiplexing, this does not change the basic essence of the operation of the deflector as such. In the first paper, the channel guide and film guide are separated from one another by a certain distance and adapted by means of an SWG structure ([5] FIG. 1.b), whereas in the second paper an SWG type artificial material means is placed between the channel guide and the slab ([6] FIG. 3.b); in both cases the intended effect is to decrease direct leakage between the channel guide and the film guide due to the zero order of diffraction.

More recently, in a detailed paper [7] on a deflector similar to the deflector described in [6], a detailed optimization of the device was performed, making patently clear that there are high losses due to the undesired radiation of the cladding of the structure. An important and limiting characteristic in these papers [5, Bock, 2008], [6, Bock, 2012], [7, Hadij-Elhouati, 2019] is that the design is performed to have a beam deflected in a direction almost perpendicular to the direction of the channel guide, i.e., deflection occurs at an angle close to 90 degrees, in order to achieve the behavior that gives rise to the simplest possible focusing of the beam; by doing it this way, this type of device is susceptible to sustaining high losses of radiation in the cladding which limit the applicability of the device. As a consequence, another important limitation of these papers is that in order to try to avoid radiated power leakages in undesired directions, 'blazed' diffractive elements have to be used, which complicates the design.

There are some other devices in the state of the art which allow performing the transfer of power from a channel guide to a beam guided through a film guide with an effective refractive index greater than the effective refractive index of the channel guide. An example of this can be found in the mode converter described in [1]. This device consists of two sections, one of which referred to as "waveguide-to-slab mode expander" performs precisely the function of transferring power from the mode of a channel waveguide to a beam guided through a film guide. However, unlike papers [3]—[7], this type of coupler works by direct leakage and does not contain any diffraction grating.

It is also known that the characteristics (losses and phase shift) of the propagation of an optical signal through a channel guide can be modified by means of the interaction with external control signals of a different nature. These devices use a known physical mechanism to modify the real part (phase modulation) or the imaginary part (amplitude modulation) of the refractive index of the medium constituting the guide, which allows obtaining a modulation functionality. Some well-known techniques include: 1) those based on electro-optic effects which utilize the Pockels effect, the Kerr effect or the plasma dispersion of certain materials to change the real part of their refractive index by means of an electrical signal; 2) electro-absorption modulators, which do the same thing but primarily modify the imaginary part of the refractive index; 3) the thermo-optic phase shifters which use the heating of the material caused by a control signal to change the real part of its refractive index. Within silicon photonics, multiple technological solutions can be found in the state of the art which allow performing these functions. Some examples of channel guides with a controllable effective refractive index include: WO2011/101632A1, which discloses a plasma dispersion modulator which allows electrically modifying the real part of the refractive index; WO2007/061986A1 and [8] disclose electro-absorption modulators which allow electrically modifying the imaginary part of the refractive index; U.S. Pat. No. 8,098,968B2 and [9] disclose thermo-optic modulators which allow modulating the real part of the refractive index.

The control of the refractive index in channel waveguides has been used in a large number of configurations to achieve different functionalities. One of the clearest examples is the use of the electro-optic effect in a Mach-Zehnder interferometer to make amplitude modulators. Other examples include filter tuning by means of the local heating of ring resonators, the adjustment and control of wavelength demultiplexing devices, and light switches between different channel guides. However, there are no systems in the state of the art which allow using the control of the real and imaginary part of the effective refractive index of a channel waveguide to efficiently manipulate the characteristics (direction, phase shift of the wavefront, amplitude) of a light beam freely propagating in any direction within a film guide.

Moreover, wavelength multiplexers are fundamental blocks which allow the aggregation in a single physical channel of modulated information on optical carriers of different wavelengths. They are bidirectional devices, so the same device can be used to aggregate different wavelengths (multiplexer) or to separate them (demultiplexer). These devices are fundamental in multicarrier optical communications systems, but they are also applicable in other situations such as sensors, spectrometers, etc.

Most integrated optical multiplexers/demultiplexers in the state of the art correspond to four different architectures [10]: ring resonator filters (RRs), lattice-form filters (LFs), arrayed waveguide gratings (AWGs), and planar Echelle gratings (PEGs). In this sense, papers [5], [6] constitute a notable exception as they are based on a rather uncommon architecture which is based on using a side deflector based on subwavelength grating, SWG, technology, placed on a circle in a typical geometry which focuses the beam diffracted by the deflector.

AWG- or PEG-based multiplexers/demultiplexers are the most promising architectures when it comes to achieving a high number of channels. Silica-based AWGs are devices that are widely used in the currently deployed services [10], allowing a wide range of channel number and spacing (from dense to coarse) and excellent crosstalk. However, their application in silicon photonics is difficult owing to two circumstances: on one hand, the devices are extremely sensitive to manufacturing errors, making it hard to align the position of the channels in the desired positions; on the other hand, the thermal coefficient of silicon is very high, which leads to high variability of the position of the channels with temperature.

In the state of the art there are solutions for performing AWG and PEG designs not sensitive to temperature (athermal) [12][13]. However, athermal designs are unable to solve the problem of the misalignment of the response of the device due to manufacturing errors, so that are not currently useful in large-scale manufacture.

Therefore, control solutions are needed which allow dynamically tuning devices so as to align their response in the desired grating and are kept in position in the event of thermal variations of the surrounding area as proposed in U.S. Pat. No. 8,285,149B2. In silicon photonics, due to the high thermo-optic coefficient of silicon, the dynamic adjustment of AWG demultiplexing devices can be performed thermally by means of thermo-optic modulators (heaters) [14][15][16]. However, these solutions offer a low energy efficiency (of the order of 4-5 nm/W in the state of the art) due to the fact that, because of their geometry, they need to heat a very large area of the chip. To improve energy efficiency for tuning AWGs, specific geometries for heaters are proposed in US20170023736A1. However, for PEG alignment, there are solutions based on the periodization of the frequency response of devices, such as in US887396162. Nevertheless, the energy efficient tuning of demultiplexers of a high number of channels continues to be a problem without a satisfactory solution in the state of the art.

The demultiplexers described in [5], [6], based on the use of a side deflector in subwavelength grating, SWG, technology, are not commonly used in practical situations as they have high losses due to radiation to the cladding, and they do not allow dynamically tuning the position of the channels to align them in the desired positions.

Optical phased arrays (OPA) are integrated optical systems which allow generating very narrow optical beams the direction of which can be controlled electronically, i.e., without moving parts. These devices are applicable in various systems, such as in LIDAR (Light Detection and Ranging) used for autonomous vehicles or FSO (Free Space Optical) communications.

OPAs comprise an array of optical antennas very close to one another which together form and direct optical beams having an elevation (θ) and azimuth (ψ) that depend on the relative phase of the fields irradiated by the gratings [17].

In silicon photonics, two basic types of OPAs have been proposed: i) two-dimensional groupings of very short grating-based nano or micro-antennas [18], US947698162, and ii) one-dimensional groupings of long and weakly radiating gratings [19], US996483362. In the first case, the conformation and direction of the beam in elevation and azimuth is achieved by means of adjusting the relative phase shift of the feed of each individual emitter; in the second case, the angle of elevation (θ) is scanned by changing the operating wavelength (which changes the radiation angle of each diffraction grating), whereas the angle of azimuth (ψ) is adjusted by means of phase shifters, usually thermo-optic phase shifters, which modify the relative phase shift of the feed of each diffraction grating. In both cases, the proposed solution is based on feeding each element of the array by means of waveguides with two-dimensional confinement, with the adjustment (of the azimuth and/or elevation) being possible by means of the phase shift introduced by each feed waveguide by means of an array of phase shifters which act individually on each feed guide. In the state of the art, it is possible to find solutions related to this field, (US20170371227A1, U.S. Pat. Nos. 10,656,496B2, 1,091, 145B2), but in all of them it is necessary to include a plurality of different phase shifters to achieve scanning in at least one of the dimensions. One of the problems with these configurations in silicon technology is that the feed phase control of each radiating element is quite often performed by means of a thermo-optic phase shifter, which gives rise to solutions that are energy-inefficient, with a low scanning speed, and to problems with isolation between the different elements of the grouping. In the state of the art there are some partial solutions to improve these aspects [20], but there are no solutions in which a lateral beam deflector is used as an optical antenna feed element for the radiation of narrow beams that can simultaneously be controlled in azimuth and elevation.

The solution proposed in [1] to generate a very wide radiated beam from a guided mode through a channel guide consists of two sections: the first section is a side deflector having the function of transferring power from the mode of the channel waveguide to a beam guided through a film guide; that beam guided through the film is caused to strike a radiation grating that works like an optical antenna. The side deflector proposed in [1] is based on the 0 order of diffraction (leakage).

REFERENCES

[1] S. Kim et al., "Photonic waveguide to free-space Gaussian beam extreme mode converter," *Light Sci. Appl*., vol. 7, no. 1, p. 72, December 2018.

[2] C. Dragone, "Efficient N*N star couplers using Fourier optics," *J. Light. Technol., vol.* 7, no. 3, pp. 479-489, March 1989.

[3] H. M. Stoll, "Distributed Bragg deflector: a multifunctional integrated optical device," *Appl. Opt*., vol. 17, no. 16, pp. 2562-2569, August 1978.

[4] R. L. Davis et al., "Distributed Bragg deflectors fabricated in sol-gel based waveguides," *IEEE Photonics Technol. Lett*., vol. 16, no. 2, pp. 464-466, February 2004.

[5] P. J. Bock et al., "Demultiplexer with blazed waveguide sidewall grating and subwavelength grating structure," *Opt. Express*, vol. 16, no. 22, pp. 17616-17625, October 2008.

[6] P. J. Bock et al., "Demonstration of a curved sidewall grating demultiplexer on silicon," *Opt. Express*, vol. 20, no. 18, p. 19882, August 2012.

[7] A. Hadij-Elhouati et al., "Distributed Bragg deflector coupler for on-chip shaping of optical beams," *Opt. Express*, vol. 27, no. 23, 2019.

[8] S. A. Srinivasan et al., "56 Gb/s Germanium Waveguide Electro-Absorption Modulator," *J. Light. Technol*., vol. 34, no. 2, pp. 419-424, January 2016.

[9] A. Masood et al., "Comparison of heater architectures for thermal control of silicon photonic circuits," *IEEE Int. Conf. Gr. IV Photonics GFP*, vol. 2, pp. 83-84, 2013.

[10] K. Okamoto, "Wavelength-division-multiplexing devices in thin SOI: Advances and prospects," *IEEE J. Sel. Top. Quantum Electron*., vol. 20, no. 4, pp. 248-257, 2014.

[11] L. Wang et al., "Athermal arrayed waveguide gratings in silicon-oninsulator by overlaying a polymer cladding on narrowed arrayed waveguides," *Appl. Opt.,* 2012.

[12] X. J. M. Leijtens, B. Kuhlow, and M. K. Smit, "Arrayed waveguide gratings," *Springer Ser. Opt. Sci*., pp. 1-5, 2006.

[13] D. Melati et al., "Athermal echelle grating filter in silicon-on-insulator using a temperature-synchronized input," *Opt. Express*, vol. 26, no. 22, p. 28651, 2018.

[14] S. Tondini, C. Castellan, M. Mancinelli, C. Kopp, and L. Pavesi, "Methods for Low Crosstalk and Wavelength Tunability in Arrayed-Waveguide Grating for On-Silicon Optical Network," *J. Light. Technol*., vol. 35, no. 23, pp. 5134-5141, 2017.

[15] Y. Yang et al., "Thermo-Optically Tunable Silicon AWG with above 600 GHz Channel Tunability," *IEEE Photonics Technol. Lett*., vol. 27, no. 22, pp. 2351-2354, 2015.

[16] Y. Xie et al., "Thermally-Reconfigurable Silicon Photonic Devices and Circuits," *IEEE J. Sel. Top. Quantum Electron*., vol. 26, no. 5, pp. 1-20, September 2020.

[17] M. J. R. Heck, "Highly integrated optical phased arrays: photonic integrated circuits for optical beam shaping and beam steering," *Nanophotonics*, vol. 6, no. 1, pp. 93-107, January 2017.

[18] H. Abediasl and H. Hashemi, "Monolithic optical phased-array transceiver in a standard SOI CMOS process," *Opt. Express*, vol. 23, no. 5, p. 6509, 2015.

[19] C. V. Poulton et al., "Coherent solid-state LIDAR with silicon photonic optical phased arrays," *Opt. Lett*., vol. 42, no. 20, p. 4091, 2017.

[20] P. A. K. Yepez, U. Scholz, J. N. Caspers, and A. Zimmermann, "Novel Measures for Thermal Management of Silicon Photonic Optical Phased Arrays," *IEEE Photonics J*., vol. 11, no. 4, August 2019.

DESCRIPTION OF THE INVENTION

As defined in the independent claims, the present invention solves problems stemming from the above-mentioned solutions. Preferred embodiments of the invention are defined in the dependent claims.

A first aspect of the invention proposes a diffraction grating defined on a channel waveguide the diffracted light of which is captured entirely by a film (slab) waveguide. Hereinafter, this device is referred to as a single-beam side deflector.

Advantages of the single-beam side deflector in embodiments thereof are:

It allows coupling the light between a channel waveguide and a film waveguide, resulting in insignificant losses in said process, even where the effective refractive index of the film guide is greater than the effective refractive index of the channel guide.

The shape of the light beam that is coupled to the channel waveguide can be controlled by progressively varying the geometry of the diffractive elements forming the diffraction grating of the deflector.

It allows dynamically changing the shape and direction of the radiated beam by means of the use of any of the known techniques which allow electrically modifying the optical characteristics of a channel guide, such as the refractive index and/or losses, for example.

Other aspects of the invention which use the single-beam side deflector are described below.

A second aspect of the invention is a single-beam side deflector, which is the first aspect of the invention, having a direction of propagation and shape of the beam generated within the target film waveguide that can be dynamically adjusted by means of control of the refractive index of the channel waveguide by means of an electrical signal. To carry out this control, any of the modulators known in the state of the art can be used including, in a non-limiting manner, those based on: 1) electrically controllable heaters placed in the proximity of the channel waveguide (thermo-optic effect); 2) the application, by means of suitable terminals, of an electric field in the channel guide which, through the electro-optic effect (Pockels effect, Kerr effect), modifies the effective refractive index thereof; 3) semiconductor junctions located in the proximity of the channel guide which, through the plasma dispersion effect, modifies the refractive index of the guide and/or modifies the attenuation that the guide causes on the optical signal.

A third aspect of the invention is a wavelength multiplexer/demultiplexer which uses the beam shaper, object of the first and/or second aspect of the invention, which is placed on a focusing geometry, for example typically a circle with a radius R, which causes the diffracted beam to be focused within the film waveguide. In said configuration, due to the dispersion introduced by the diffraction grating, the focal point will move very approximately on the so-called Rowland circle, a circle with a radius R/2 which is located within and is tangent to the circle on which the deflector is placed. Several suitably sized channel guides are placed on the Rowland circle to capture the focused light. Different wavelengths will thereby be captured by different receiver channel guides by spatially separating the wavelengths in this way.

A fourth aspect of the invention is the use of the single-beam side deflector as a feeder of a diffraction grating acting like an optical antenna following a scheme similar to that used in [1]. In the proposed scheme, a single-beam deflector, first aspect of the invention, is used to transfer power from the mode of the channel waveguide to a beam guided through a film guide. The direction of said beam can be dynamically modified, with great energy efficiency, by varying the effective refractive index of the channel guide by means of any of the methods described in the second aspect of the invention. The beam trapped by the film guide is caused to strike a vertical radiation grating which acts like an optical antenna. The arrangement of these elements allows simultaneously controlling the azimuth and the elevation of the radiated beam by means of the adjustment of the working wavelength (which performs a simultaneous scanning in azimuth and elevation) and the control of the beam angle coupled to the film guide by the single-beam side deflector, which allows controlling the azimuth of the radiated beam.

In a first configuration, the single-beam side deflector, first aspect of the invention, comprises: a substrate, on which there is arranged a channel waveguide and in proximity of this, there is a film waveguide. All the mentioned elements are covered with a cladding material. The device has a defined periodic diffraction grating, with period $\Lambda$, in the direction of propagation, which is etched preferably, but in a non-limiting manner, on the channel waveguide.

All the elements making up the single-beam deflector can be made up of isotropic materials, anisotropic materials, or artificial metamaterials such as subwavelength grating (SWG) materials, which synthesize an anisotropic material. Furthermore, in the most general case, the substrate, cladding, channel guide, and film guide materials can all be different from one another. Below it is assumed, for the sake of simplicity and without loss of generality, that all the materials used are isotropic and that substrate and cladding are formed by the same material with refractive index $n_a$.

Note that the single-beam side deflector proposed herein can be seen, in its simplest form, as three transmission media placed in proximity: the channel guide, the film guide and the surrounding medium which can be considered homogenous and infinite.

The periodically disturbed channel waveguide is characterized by the effective refractive index exhibited by the fundamental Floquet-Bloch mode $n_B$ for the working wavelength and the working polarization, which can be TE or TM. The Floquet-Bloch modes can be expressed as the superposition of non-homogeneous plane waves whose wave vectors are given by $$\overrightarrow{k_{B,r}} = (k_0 n_B - r \cdot 2\pi/\Lambda) \cdot \hat{z}, \tag{1}$$

where $k_0=2\pi/\lambda_0$ is the wavenumber in a vacuum, $\hat{z}$ is the unit vector in positive z direction (the direction of propagation of the channel guide) and r is an integer which designates the order of diffraction.

Moreover, for the particular case of being formed by an isotropic material, the fundamental mode of the film waveguide polarized according to the working polarization (TE or TM) is characterized by the effective refractive index $n_s$, and for the case of an isotropic material, it is independent of the direction of propagation within the film waveguide. Note that in order for there to be two-dimensional confinement in the channel guide, the effective refractive index of the film guide $n_s$ must be less than that of the channel waveguide $n_B$. This can be achieved in various ways: by using the same material for the film and channel guides but setting the thickness $H_s$ of the film guide to a value less than the thickness of the channel waveguide $H_B$; alternatively, it is possible to use in both guides the same thickness and to use in the film guide a material or a synthetic metamaterial with a refractive index less than that which forms the channel waveguide; it is also possible to use a combination of both strategies.

The waves that can propagate in the film guide must satisfy the dispersion relation of a two-dimensional infinite medium. That is, the wave vectors of the waves propagating within the film waveguide must satisfy the following:

$$\vec{k_s}(\theta) = (k_{s,x} \cdot \hat{x} + k_{s,z} \cdot \hat{z}), \quad |k_{s,x}|^2 + |k_{s,z}|^2 = \left(\frac{2\pi}{\lambda_0} n_s\right)^2 \tag{2}$$

where $\lambda_0$ is the wavelength in a vacuum. Said waves propagate with an angle $\theta$ with respect to the x-axis given by $$\tan(\theta) = \frac{k_{s,z}}{k_{s,x}} \tag{3}$$

Meanwhile, the substrate and cladding must satisfy the known dispersion relation of the homogeneous plane waves in a homogeneous and infinite isotropic medium as follows:

$$\vec{k_a} = k_{a,x} \cdot \hat{x} + k_{a,y} \cdot \hat{y} + k_{a,z} \cdot \hat{z}, \quad |k_{a,x}|^2 + |k_{a,y}|^2 + |k_{a,z}|^2 = \left(\frac{2\pi}{\lambda_0} n_a\right)^2 \tag{4}$$

Moreover, a necessary condition for there to be an efficient power coupling from the channel waveguide to any of the other transmission media is the so-called phase-matching condition or momentum-matching, i.e., $k_{s,z}=k_{a,z}=(k_0 n_B - r \cdot 2\pi/\Lambda)$ Therefore, in order to achieve coupling between the channel waveguide and the film waveguide and prevent any undesired coupling to the cladding or substrate, the period and the geometry of the channel guide can be designed so that the condition of momentum-matching can occur between the channel guide and the film guide but cannot be satisfied between the channel guide and the substrate or the cladding.

In order for the condition of momentum-matching not to be satisfied and to therefore prevent the power coupling between the channel guide and the substrate or cladding, the following must be satisfied for all integers r:

$$\left|k_0 n_B - r\cdot\frac{2\pi}{\Lambda}\right| > k_0\cdot n_a \tag{5}$$

Moreover, in order for power coupling from the channel guide to the film guide to occur in a single beam, there must be a single order of diffraction r that satisfies the following:

$$\left|k_0 n_B \mp r\cdot\frac{2\pi}{\Lambda}\right| < n_s k_0 \tag{6}$$

The simultaneous satisfaction of the two inequalities (5) and (6) allows the operation of the deflector in the single-beam mode, allowing the efficient coupling of the optical power between the channel and film guides, preventing the radiation of power towards the substrate and cladding. For the most common case in the silicon photonics, this condition can be found for the order of diffraction r=−1 in which case the single-beam operation condition is simplified to:

$$-n_s < n_B - \frac{\lambda}{\Lambda} < -n_a \tag{7}$$

It should be noted that even though, for the sake of simplicity, the description of this operating principle has been performed under the assumption that the substrate and the cladding had the same refractive index $n_a$, expressions (5) and (7) can be generalized to the case of different substrate and cladding indexes by simply choosing the value of $n_a$ as the higher of the two refractive indexes of the materials making up the substrate or the cladding.

This condition can equivalently be seen as the −1 order of diffraction having to diffract within the film waveguide with an angle θ with respect to the direction perpendicular to the direction of propagation and contained on the plane of the film waveguide that, in magnitude, this angle θ, is greater than $\arcsin(n_a/n_s)$. In the event that the refractive indexes of cladding ($n_c$) and substrate ($n_a$) are different, the preceding condition will apply to the larger of the two, i.e., the magnitude of the angle θ must be greater than $\arcsin(\max\{n_a, n_c\}/n_s)$.

When said condition is satisfied, the device ideally and progressively diffracts the light guided through the channel waveguide towards the film waveguide exclusively and in a single direction within same. It is important to note that this single-beam condition will occur regardless of how periodicity is introduced in the channel waveguide, with the only important aspect being the period Λ and the effective refractive index of the fundamental Floquet-Bloch mode n B. Therefore and by way of examples, the desired periodicity could be achieved by varying the refractive index constituting the channel waveguide along the direction of propagation; the desired periodicity could also be achieved by modifying the width of the guide W(z) periodically along the direction of propagation z; another alternative would be to place loading blocks along the direction of propagation in the proximity of the channel waveguide.

The beam generated by the single-beam side deflector can be arbitrarily shaped in amplitude and phase. To that end, it is necessary to concatenate, following the direction of propagation of the light wave through the channel guide, a plurality of sections of single-beam side deflectors the geometry of which varies, preferably in a smooth manner, along the direction of propagation for the purpose of shaping the amplitude and/or the phase of the diffracted wave, the single-beam radiation condition being maintained in each section. For example, in the case of the deflector the diffraction grating of which is based on a sinusoidal variation of the width, i.e., $$W(z) = W_g\cdot\left(1 + D_g\cdot\mathrm{sine}\left(\frac{2\pi}{\Lambda}\cdot z\right)\right),$$

this could be achieved by varying the modulation depth $D_g(z)$ along the direction of propagation z to adjust the modulus of the diffracted beam and adjusting the period Λ(z) to adjust the phase of the radiated beam.

To achieve this, the variation in radiation force that is required along the direction of propagation in the deflector α(z) must first be calculated in order to achieve a certain diffracted field profile modulus |g(z)| by means of the following expression:

$$\alpha(z) = \frac{|g(z)|^2}{2\left(\frac{1}{C_{rad}} - \int_{-\infty}^{z}|g(\tau)|^2 d\tau\right)} \tag{8}$$

where $C_{rad}$ is the proportion of power entering the deflector to be coupled to the film waveguide and $|g(z)|^2$ is normalized such that $$\int_{-\infty}^{+\infty}|g(z)|^2 dz = 1.$$

Moreover, by means of Bloch-Floquet mode analysis, each of the teeth of the deflector can be designed to synthesize the desired radiation force α(z).

The film waveguide in the case of being formed by an anisotropic material or an SWG structure will have an effective refractive index $n_s(\theta)=|\vec{k}_s(\theta)|/k_0$ that will depend on the direction of propagation within this waveguide defined by the propagation vector as $\theta=\angle\vec{k}_s(\theta)$. That is, expression (2) defining a circle in the wave vector diagram is no longer valid. In this case, the wave vectors allowed within the film waveguide form an ellipse. In this situation, the parameter n s of expression (7) is set at that effective refractive index resulting from maximizing the projection of the normalized wave vector $\vec{k}_s(\theta)/k_0$ on the direction of propagation within the channel waveguide, z-axis in this case, with respect to the direction of propagation within the film waveguide θ. That is:

$$n_s = \max_{\theta}\left\{\frac{|\vec{k}_s(\theta)\cdot\hat{z}|}{k_0}\right\}. \tag{9}$$

In the event that the substrate and the cladding are formed by two different isotropic materials characterized by refractive indexes $n_s$ and $n_c$, respectively, then in condition (7) $n_a$ must be set to the larger of the indexes. That is, $n_a=\max\{n_s, n_c\}$.

The channel waveguide of the first aspect of the invention may preferably be one of the following types: channel guide, rib guide, or diffused guide.

Preferably, the single-beam deflector is implemented in silicon-on-insulator (SOI) technology, in which the material of the substrate is silicon dioxide ($SiOR_2$), the cladding material can preferably be selected from air, silicon dioxide, or a polymer, the material constituting the channel waveguide is silicon, and the material of the film waveguide is preferably silicon or a metamaterial made with the combination of silicon and the cladding material.

A second configuration of the single-beam side deflector allows efficiently resolving a more useful situation which occurs when power is desired to be transferred from a channel waveguide with an effective refractive index $n_B$ to a target film guide the effective refractive index n s of which is greater than that of the effective refractive index of the channel waveguide. In this case, it is not possible to place the target film guide in proximity to the channel guide, as a transfer of power (leakage) would take place through the 0 order of diffraction.

To resolve this situation, the proposed solution is to place in proximity of the channel guide an auxiliary film waveguide with an effective refractive index $n_{aux}$ less than the effective refractive index of the channel waveguide $n_B$ and with a width $W_{aux}$. In this way, the deflector formed with this auxiliary waveguide is capable of satisfying the single-beam condition diffraction, described by expressions (5), (6), and (7), thus preventing losses due to diffraction to the substrate and/or cladding. The device has a defined periodic diffraction grating, with period $\Lambda$, in the direction of propagation, which is etched preferably, but in a non-limiting manner, on the channel waveguide.

In this configuration the auxiliary film guide is located separating the channel waveguide from the target film guide to which power is ultimately to be transferred. The auxiliary film guide provides the dual function of: a) allowing lossless deflection from the channel guide towards the auxiliary film guide, and b) avoiding direct diffraction from the channel guide to the target film guide through the zero order of diffraction (leakage). To allow lossless deflection, the effective refractive index of the auxiliary film guide $n_{aux}$, must be suitably selected so that it satisfies the single-beam radiation condition. To avoid direct diffraction from the channel guide to the target film guide, the width of the auxiliary film guide $W_{aux}$, must be adjusted for the evanescent field of the mode of the film guide to be sufficiently attenuated so that the direct leakage is reduced to the desired value.

The auxiliary film guide can be manufactured in different ways, including the following alternatives: a) using the same material as that the used for the target film guide or for the channel guide but setting the thickness of the auxiliary guide $H_{aux}$ at a value different from the one used for the channel waveguide $H_B$ and target film waveguide $H_s$; b) alternatively, it is possible to use in the auxiliary film guide the same thickness as that used in the channel guide or in the target film guide; c) it is possible to use in the auxiliary film guide a material or a synthetic metamaterial with an index different from the one used in the channel guide or in the target film guide; d) it is also possible to use a combination of both strategies.

Note that, in this second configuration, the operation of the single-beam side deflector takes place in two steps: a) first transferring power from the mode of the channel guide (with effective refractive index $n_B$) to a single beam which propagates in the auxiliary film guide (with effective refractive index $n_{aux}<n_B$), and b) subsequently transferring the power of the beam which propagates in the auxiliary film guide to the target film waveguide (with refractive index $n_s>n_B$). It is possible to transfer power from the auxiliary film guide to the target film guide directly, by placing them in sufficient proximity to one another, or by means of an intermediate modal adaptation structure with width $W_{adapt}$ which optimizes the transmission of power between the two film waveguides, minimizing losses due to reflection and radiation in the transition.

One aspect of the invention associated with the first aspect of the invention relates to a method that comprises: providing a single-beam side deflector according to the first configuration described above and/or the second configuration described above; and inputting an optical signal with a working wavelength and polarization in the deflector, particularly in the channel waveguide of the deflector.

Another aspect of the invention associated with the first aspect of the invention relates to a method that comprises: providing a concatenation of sections of single-beam side deflectors according to the first configuration described above and/or the second configuration described above; and inputting an optical signal with a working wavelength and polarization in a side deflector section, particularly in the channel waveguide of the side deflector section; the sections are concatenated in the direction of propagation of the optical signal through the channel waveguide, and a geometry of the channel waveguide is adapted to shape an amplitude and/or phase of a diffracted wave, the single-beam radiation condition being maintained in each section.

Embodiments described in relation to the first aspect of the invention are likewise applicable to these aspects of the invention associated with said first aspect of the invention.

A second aspect of the invention is a single-beam side deflector the generated beam of which can be dynamically and locally adjusted in amplitude and phase (and therefore also in direction), by means of any of the effects known to modulate the phase and the amplitude of a wave which propagates through a dielectric guide including, in a non-exclusive manner, the modulators by: Pockels effect, Kerr effect, plasma dispersion, electro-absorption or thermo-optic modulators, or any other type of modulator described in the state of the art which acts by allowing the adjustment of the losses and/or the effective refractive index of the channel guide that is part of the single-beam deflector.

In order to carry out the phase adjustment, the channel waveguide must be equipped with electrodes and/or materials which allow changing the refractive index of the mode which propagates through the guide by any known effects: optical, electric, thermal, etc. In this later case, which is especially common in silicon photonics due to the high thermo-optic coefficient, electric heaters which are placed in proximity of the channel waveguide that is part of the deflector must be used. An electrical signal applied on the heaters thereby locally varies the refractive index of the channel waveguide and this change in the refractive index is transferred to the Floquet mode effective refractive index $n_{B,0}$ which controls the phase of the diffracted field.

In a general and approximate manner, it can be said that by means of one or more modulators which act along the device's longitudinal coordinate (z), it is possible to locally control the effective refractive index of the mode which propagates through the channel guide $n_{B,0}(z)$. This variation in effective refractive index induced by the modulator $\Delta n_B(z)$ causes a local phase shift of the diffracted wavefront $\phi(z)$ which is given by $$\phi(z) = \int_0^z \frac{2\pi}{\lambda} \Delta n_B(z') dz'. \quad (10)$$

In the simplest case, in which a single modulator is arranged in a homogeneous manner along the entire deflector, the application of the control signal introduces a change in effective refractive index that is constant along the deflector $\Delta n_B(z)=\Delta n_B=$const., which causes a cumulative phase shift that grows linearly along the device $$\phi(z) = \frac{2\pi}{\lambda} \Delta n_B z.$$

This change in phase causes a rotation of the front of the diffracted wave, and it is thereby possible to electrically adjust the direction θ in which the diffracted beam propagates within the film waveguide, the functionality which allows varying the beam angle θ by means of an electrical control signal being obtained in a simple manner. The variation in propagation angle Δθ within the film waveguide with effective refractive index n s when a variation $\Delta n_B$ in the Floquet-Bloch effective refractive index takes place can be obtained immediately as $$\Delta\theta = \frac{1}{n_s \cdot \cos(\theta_0)} \cdot \Delta n_B \quad (11)$$

The invention is not limited to the use of thermoelectric modulators, because the same effect of control over the phase front of the diffracted wave can be performed by any other of the means used to modulate the phase of a wave guided through a dielectric channel guide, such as modulators based on the electro-optical effect, optical modulators or plasma dispersion modulators, each of which requires a special arrangement of electrodes and/or materials around the channel guide which are known in the state of the art.

Similarly, it is possible to use modulators which, based on electro-absorption or other effects reported in the state of the art, act locally on the attenuation experienced by the wave which propagates through the channel guide. It is therefore also possible to locally vary the amplitude of the wave which propagates along the device, which allows locally shaping the amplitude of the diffracted beam. Note that the conformation of beam based on this operating principle is based on a relation between the local attenuation introduced by the modulator α(z) and the local amplitude of the diffracted wave g(z) which is governed by an equation similar to the equation (8), which allows matching the attenuation profile to the profile of the desired beam.

An aspect of the invention associated with the second aspect of the invention relates to a method that comprises: providing a single-beam side deflector according to the first aspect of the invention (according to the first configuration described above and/or the second configuration described above); inputting an optical signal with a working wavelength and polarization in the side deflector, particularly in the channel waveguide of the deflector; providing a modulator along the channel waveguide of the deflector to modify the effective refractive index of the channel waveguide by means of one or more of thermo-optic modulators, electro-optic modulators, plasma dispersion modulators, or electro-acoustic modulators; and dynamically controlling, by means of the modulator provided, an angle by which the single beam is deviated in the target film waveguide of the deflector. Embodiments described in relation to the second aspect of the invention are likewise applicable to this aspect of the invention associated with said second aspect of the invention.

A third aspect of the invention is a wavelength multiplexer/demultiplexer which uses the single-beam deflector, the first aspect of the invention or of the dynamically adjustable single-beam deflector (second aspect of the invention). The demultiplexing functionality arises from the dispersive nature of the deflector since the angle θ at which the light diffracted within the film waveguide propagates varies with wavelength. For example, in the event that the film waveguide is made up of an isotropic material and that the fundamental mode of this guide has refractive index n s for the working polarization, the propagation angle θ will be given by:

$$\theta = a\sin\left(\frac{n_{B,0} - \frac{\lambda_0}{\Lambda}}{n_s}\right) \quad (12)$$

where $n_{B,0}$ is the effective refractive index of the fundamental Floquet mode of the channel waveguide, $\lambda_0$ is the working wavelength, Λ is the periodicity of disturbance of the channel waveguide.

In this way, a single-beam deflector, the beam of which is preferably shaped to have a Gaussian amplitude, is located on a focusing curve, preferably a circle with a radius R, on the inside of which the film guide is located. In this configuration, the diffracted light will be focused on a point within the film guide that will change with the wavelength. The light corresponding to different wavelengths is thereby spatially separated. In the case of using a circle as a focusing curve, the path followed by the focal point as the wavelength varies will correspond very approximately with the so-called Rowland circle. The Rowland circle is a circle which: 1) has as its radius half the radius of the circle on which the deflector is placed, 2) is inside the circle on which the deflector is placed, and 3) these two circles, the Rowland circle and the circle of the deflector, are tangent to one another in the position of the deflector where the deflector has radiated half of the total radiated power. The film guide is cut following the Rowland circle in the surrounding area of the focal points of the central wavelengths of the channels. As many suitably sized and oriented channel guides as there are or as there will be channels in the demultiplexer are placed at the boundary of this cut. The exact position and separation of these guides will be given by the central wavelengths of the channels of the demultiplexer, the bandwidth thereof and the level of crosstalk between adjacent channels which can be tolerated. However, the orientation thereof is imposed by the direction in which the beam generated by the deflector propagates within the film waveguide θ.

In the embodiment of this demultiplexer, it is crucial to be able to shape both the amplitude and the phase of the beam diffracted by the single-beam deflector since the quality with which the different wavelengths are separated is dependent on same. An unshaped beam, i.e., the beam that would be produced by a perfectly periodic deflector, would produce an exponential type beam with a linear phase, this type of beam would introduce important insertion losses since the light at the focus will not have the form the of the mode of the receiver guide, and furthermore the linear phase when the radiation angle is located away from the vertical would give rise to the occurrence of secondary lobes in the focused light which would introduce undesired interferences in the adjacent receiver guides.

The use, within the described geometry, of a single-beam deflector in which the direction of the generated beam can be adjusted dynamically by means of a control signal acting on a modulator (second aspect of the invention) allows readily tuning the channels of the demultiplexer in wavelength. In this configuration, the adjustable deflector is also located on a focusing geometry (typically a circle), so by acting on the control signal of the modulator, the direction in which the diffracted beam is emitted is modified locally, which allows adjusting the focus of the beam on the outlet guides. In the simplest case, wherein a single modulator is arranged in a homogeneous manner along the entire deflector, the application of the control signal introduces a change in effective refractive index that is constant along the deflector $\Delta n_B(z) = \Delta n_B$=const. which causes a variation of the angle at which the diffracted beam is deflected $\Delta\theta$ which is also constant along the entire deflector, which in turn causes the focal point to follow a path along the Rowland circle the arc length of which is approximately equal to $$\frac{R}{n_s \cos(\theta)} \Delta_{nB}.$$

It should be pointed out that because the path followed by the focal point upon varying the wavelength coincides with the path produced upon acting on the control signal of the deflector, it is possible to use this control signal for tuning the demultiplexer in wavelength, which allows readily aligning the position of the channels of the demultiplexer in wavelength with a pre-established grating. By allowing the dynamic alignment of the channels in a simple manner, this property allows readily offsetting the misalignment of the channels which typically takes place due to manufacturing errors in demultiplexers based in silicon technology.

Due to the principle of reciprocity of electromagnetism, the entire functionality of the device as a demultiplexer (one input and several outputs) can be directly transferred to its operation as a multiplexer, i.e., where the role of inputs and outputs is reversed. In this configuration, the outlet guides are used to input several channels with information at different wavelengths and the combined signal, with the multiplexed information of all the input channels, is extracted through the input waveguide.

One aspect of the invention associated with the third aspect of the invention relates to a method that comprises: providing a wavelength multiplexer/demultiplexer; and inputting at least one optical signal with a working wavelength and polarization in the multiplexer/demultiplexer; wherein the multiplexer/demultiplexer comprises: a single-beam side deflector according to the first aspect of the invention (according to the first configuration described above and/or the second configuration described above); a curved support on which the deflector is arranged for generating a beam which is focused inside the target film waveguide of the deflector; and a plurality of receiver channel waveguides located at points of the target film waveguide in which the diffracted beam is focused for different wavelengths, such that by changing the working wavelength, the beam is predominantly focused on one of the receiver waveguides capturing the light. Embodiments described in relation to the third aspect of the invention are likewise applicable to this aspect of the invention associated with said third aspect of the invention.

A fourth aspect of the invention is an optical antenna feeder based on single-beam side deflector (first aspect of the invention) or on a single-beam side deflector the generated beam of which can be dynamically adjusted in direction (second aspect of the invention). In this configuration, the single-beam deflector is used to convert the mode of the channel guide into a beam width which propagates through the film guide. The particularities of the single-beam deflector allow performing a conversion from a very confined mode (the mode of the channel guide) to a very wide beam in a reduced space and without introducing significant losses. Furthermore, the direction of this beam can be adjusted dynamically, and independently of the operating wavelength by using the second aspect of the invention, which allows controlling the propagation beam angle on the plane of the chip. The beam generated by the single-beam side deflector propagates through the film guide and strikes an also wide diffraction grating which acts as an optical antenna by diffracting the light out of the plane of the chip. The force of the diffraction grating can be adjusted and/or apodized, by means of any of the options existing in the state of the art in order to adjust it to the length that the beam is to have in the direction in which the beam propagates through the grating.

The architecture of this invention allows having two degrees of freedom in order to adjust the azimuth (angle on the plane of the chip) and the elevation (angle with respect to the normal of the chip) simultaneously. By acting on the modulator acting on the channel guide, it is possible to dynamically adjust the direction of the beam generated by the deflector, which varies the angle at which said beam strikes the diffraction grating which acts as an optical antenna. It is thereby possible to adjust the azimuth of the beam radiated by the antenna. Similarly, due to the dispersive characteristics of the single-beam deflector and of the diffraction grating which acts as an optical antenna, it is possible to change the elevation of the beam radiated by the diffraction grating by acting on the wavelength at which the device is operated. The modification of the wavelength of the light causes a simultaneous variation of the azimuth (due to the dispersion of the single-beam deflector) and of the elevation (due to the dispersion of the diffraction grating used as an optical antenna) of the radiated beam.

Therefore, this fourth aspect of the invention, in which a single-beam deflector is used as a feeder of a diffraction grating which acts as an optical antenna, allows efficiently generating radiated beams the width of which is of the order of hundreds of microns, even a few millimeters (and if weak diffraction gratings are used, the length of these optical beams may also measure a few millimeters) and the radiation direction thereof may be controlled in a simple manner both in azimuth and in elevation by means of: i) the control signal of the modulator acting on the channel guide, and ii) the operating wavelength of the device.

An aspect of the invention associated with the fourth aspect of the invention relates to a method that comprises: providing an optical antenna feeder; and inputting at least one optical signal with a working wavelength and polarization in the feeder; wherein the feeder comprises: a single-beam side deflector according to the first aspect of the invention (according to the first configuration described above and/or the second configuration described above); and a diffraction grating etched on the target film waveguide of the deflector; wherein the deflector and the diffraction grating are arranged for a generated beam to strike the diffraction grating. Embodiments described in relation to the fourth aspect of the invention are likewise applicable to this aspect of the invention associated with said fourth aspect of the invention.

BRIEF DESCRIPTION OF THE DRAWINGS

To complement the description that is being made and for the purpose of helping to better understand the features of the invention, a set of drawings is attached as an integral part of said description, said drawings depicting the following in an illustrative and non-limiting manner.

PREFERRED EMBODIMENTS OF THE INVENTION

Several preferred embodiments of the aspects of the invention are described below with the help of FIGS. 1 to 16.

Single-Beam Side Deflector

Figure 1:
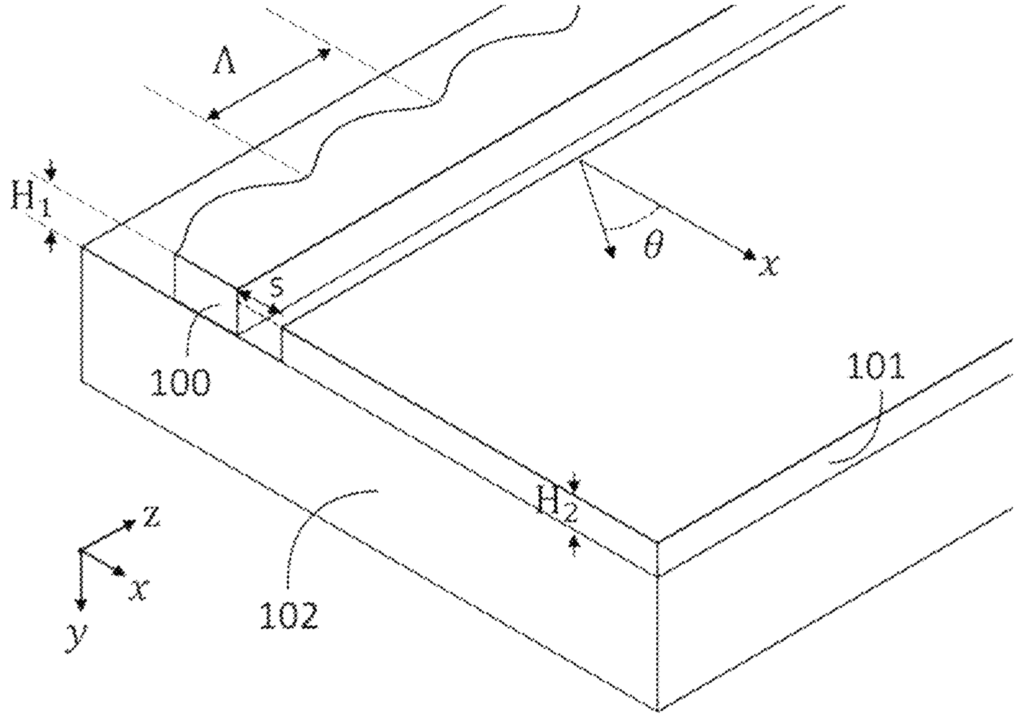
FIG. 1 shows a diagram of a first configuration of the single-beam deflector which diffracts the light from a periodic channel waveguide with effective refractive index $n_B$ towards a film waveguide with effective refractive index $n_s$ less than $n_B$.
Figure 2:
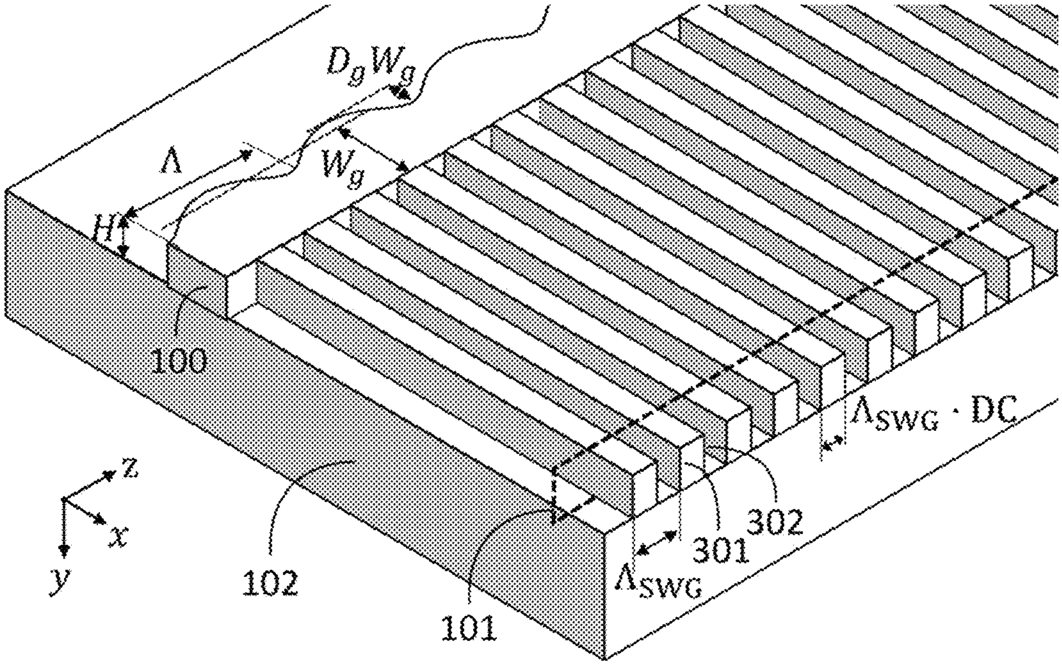
FIG. 2 schematically shows a perfectly periodic deflector in which the film waveguide has been implemented by means of a structure periodic subwavelength.

FIG. 1 schematically shows a first configuration of the essential part a perfectly periodic single-beam deflector which is capable of performing the transfer of power from a channel guide to a film guide with an effective refractive index less than the channel guide. This deflector is formed by a channel guide (100) having a periodic disturbance of period Λ, a target film waveguide (101), a substrate (102) on which both waveguides and a cladding covering same (the cladding is not shown in FIG. 1 for greater clarity) are supported. The channel waveguide and the film waveguide can be formed by different materials and/or have different thicknesses ($H_1 \neq H_2$). The channel waveguide and the film waveguide can be separated by a distance S or be located next to one another (S=0). The effective refractive index of the channel guide and the film guide are, respectively, $n_B$ and $n_s$, satisfying the condition that the index of the film guide is less than the index of the channel guide, i.e., $n_s < n_B$ FIG. 2 shows an embodiment of the essential part of the first configuration of the deflector described in FIG. 1 on silicon-on-insulator technology of 220 nm in which the film guide (101) is made by means of an SWG material the duty cycle DC of which has been selected to synthesize the desired effective refractive index. In this specific embodiment, spacing 's' equal to zero has been chosen and the thicknesses of the guides $H_1$ and $H_2$ are equal to one another and equal to the thickness of the silicon of the wafer. The first configuration of the single-beam deflector comprises:

- a channel waveguide in which there has been etched with a periodic side disturbance of period Λ which, in a non-limiting manner, has been chosen to be of a sinusoidal type (100),
- a film waveguide implemented by means of a subwavelength grating (SWG) metamaterial (101) consisting of the intercalation of silicon blocks (301) and silicon dioxide gaps (302) along the direction of propagation. This means SWG is characterized by its period $\Lambda_{SWG}$ and its duty cycle DC.

By way of illustration, a wafer with a silicon layer 220 nm thick has been used.

It is placed on 2 μm of embedded silicon dioxide (Buried Oxide, BOX) (102) and is protected by another 2 μm of silicon dioxide which is deposited on the silicon layer after defining the devices.

The nominal width of the channel waveguide $W_g$ has been set at 600 nm to achieve a proper confinement in the channel waveguide. A periodic sinusoidal modulation of the width with a period Λ and a modulation depth controlled by means of the parameter $D_g$ is superimposed on same. With this geometry, the fundamental Floquet mode has an effective refractive index $n_B$ of approximately 2.6.

Figure 3:
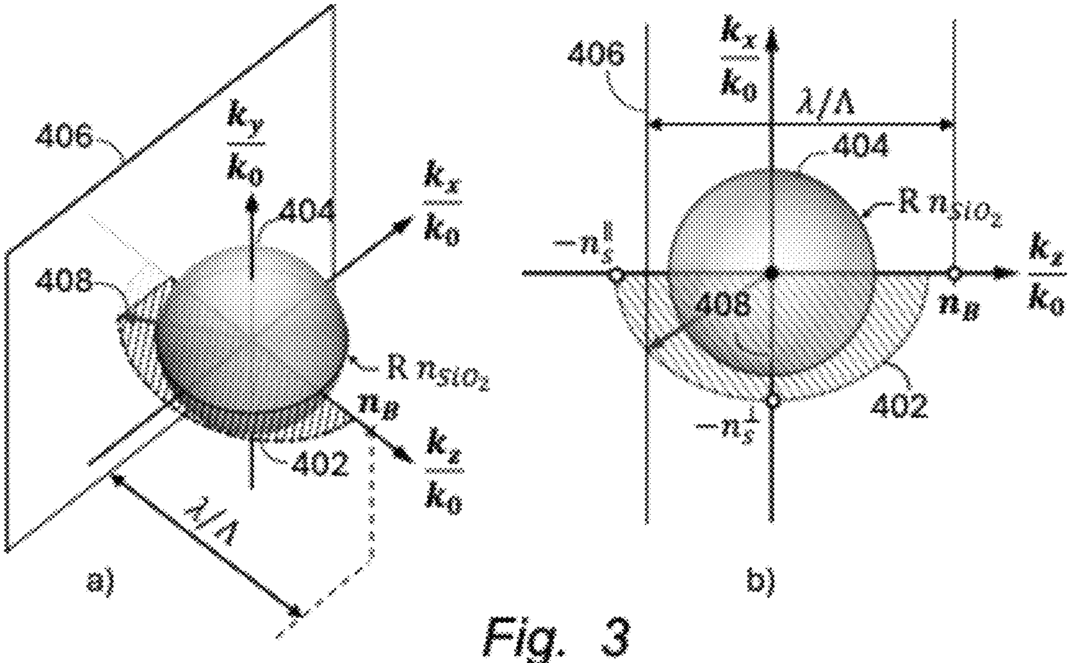
FIG. 3 graphically shows the phase-matching condition in the event that the single-beam condition is satisfied and there is a single radiated beam within the film waveguide. The arrow protruding from the origin of coordinates indicates the direction of propagation within the film waveguide.
Figure 4:
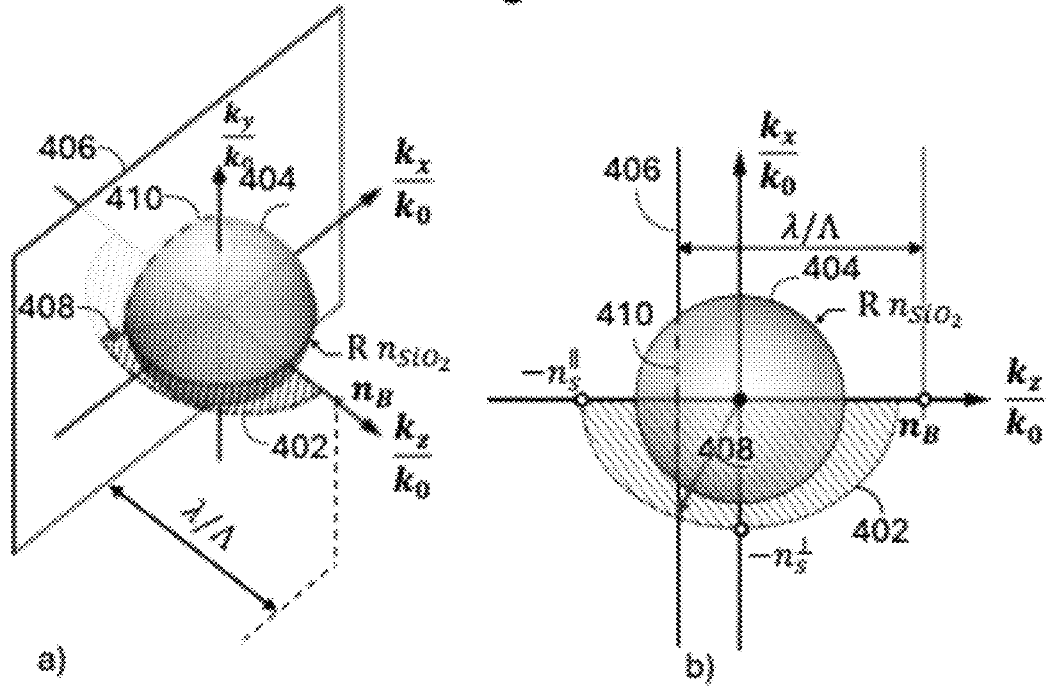
FIG. 4 graphically shows the phase-matching condition in the event that the single-beam condition is not satisfied and there are several radiated beams: one in the film guide, another one in the substrate medium, and another one in the cladding medium. The arrow protruding from the origin of coordinates indicates the direction of propagation within the film waveguide.

The two parameters defining the SWG metamaterial (the period $\Lambda_{SWG}$ and the duty cycle DC) must be designed to ensure that in the entire bandwidth of interest, the single-beam condition (7) illustrated in FIG. 3 is satisfied. In this preferred embodiment, $\Lambda_{SWG}$ has been set at 200 nm and DC has been set at 0.5. With this geometry, the SWG film guide behaves like an anisotropic metamaterial having an effective refractive index that depends on the direction of propagation within same. More specifically, as shown in FIGS. 3 and 4, the dispersion diagram, which shows the geometric location of the wave vectors allowed within this SWG film waveguide, is a planar ellipse (402) in the diagram of the normalized wave vectors, $\vec{k}/k_0$. In particular, in this ellipse, the semi-major axis is aligned with the z-axis and measures $$n_s^{\parallel} \approx 2.2$$

≈2.2 and the semi-minor axis is aligned with the x-axis and measures $$n_s^{\perp} \approx 1.8.$$

≈1.8. To illustrate the single-beam radiation condition, which is the essence of the invention, FIGS. 3 and 4 also show the dispersion diagram of the cladding material (not shown in FIG. 2) and substrate (102) surrounding the channel and film waveguides. This is a sphere (404) with a radius equal to the silicon oxide index $n_{SiO2}$. These figures also show how on axis $k_z/k_0$ the value of the Bloch-Floquet effective refractive index $n_B$ and the plane (406) $n_z = n_B - \lambda/\Lambda$ showing the momentum matching condition which must satisfy the −1 order of diffraction. As indicated in FIG. 3, period Λ of the single-beam side deflector must be selected to satisfy the single-beam condition described by expression (7). It must be borne in mind that in this case, this condition is not directly applicable since the film guide to which the light is or will be coupled is made up of an anisotropic SWG metamaterial, and therefore the effective refractive index of this waveguide depends on the direction of propagation of the beam within same. Therefore, and as indicated by expression (9), the maximum projection of the normalized wave vector on the axis of propagation is to be used as $n_s$. In this case, this corresponds with $$n_s = n_s^{\parallel} \approx 2.2.$$

Therefore, the period should be selected from the following range:

$$\left(\frac{\lambda_0}{n_s + n_B}, \frac{\lambda_0}{n_a + n_B}\right) = (323 \text{ nm}, 384 \text{ nm}) \tag{13}$$

The nominal period chosen is Λ=360 nm, which is an intermediate value of the interval. This situation, in which the single beam condition is satisfied, is represented in the dispersion diagram of FIG. 3 where it is observed that the plane that defines the −1 order of diffraction (406) does not intersect with the sphere (404) that characterizes the propagation in the silicon oxide, thus preventing power to be released towards the cladding and substrate. However, the plane (406) does intersect the ellipse (402) that characterizes the dispersion diagram in the film guide and does so at a single point that defines the direction of propagation, indicated by the vector (408), in which the single beam propagates through the film guide.

Equivalently, expression (13) can be expressed as a function of the angle θ at which the diffracted beam propagates within the waveguide of silicon. In this case, the equivalent condition would be that the diffracted beam must propagate within the silicon film waveguide at an angle θ with respect to the direction perpendicular to the direction of propagation and contained in the plane of the film waveguide which in absolute value is greater than 30°, i.e., |θ|>30°. This moves it markedly away from diffraction near the direction normal to the direction of propagation within the channel waveguide ($\theta=0°$ r) as has been used to date in deflecting devices.

Illustratively, FIG. 4 shows a hypothetical situation in which the single-beam condition (7) is not satisfied because the $\lambda/\Lambda$ factor has not been properly designed. In this case, the plane (406) not only intersects the ellipse at a point (which determines the direction of propagation in the auxiliary film guide) but also intersects the sphere forming a circle (410) showing that power radiation towards the cladding and substrate in any direction indicated by said circle (410) is possible. In order to claim the novelty of the proposed invention, it should be noted that previously existing designs in the prior art presented configurations like the one shown in this FIG. 4 and, therefore, lost part of the light power in the form of radiation outside the plane of the chip, which increased their insertion losses. In contrast, the proposed invention makes use of a design as shown in FIG. 3 in which the single beam radiation condition occurs.

Figure 5:
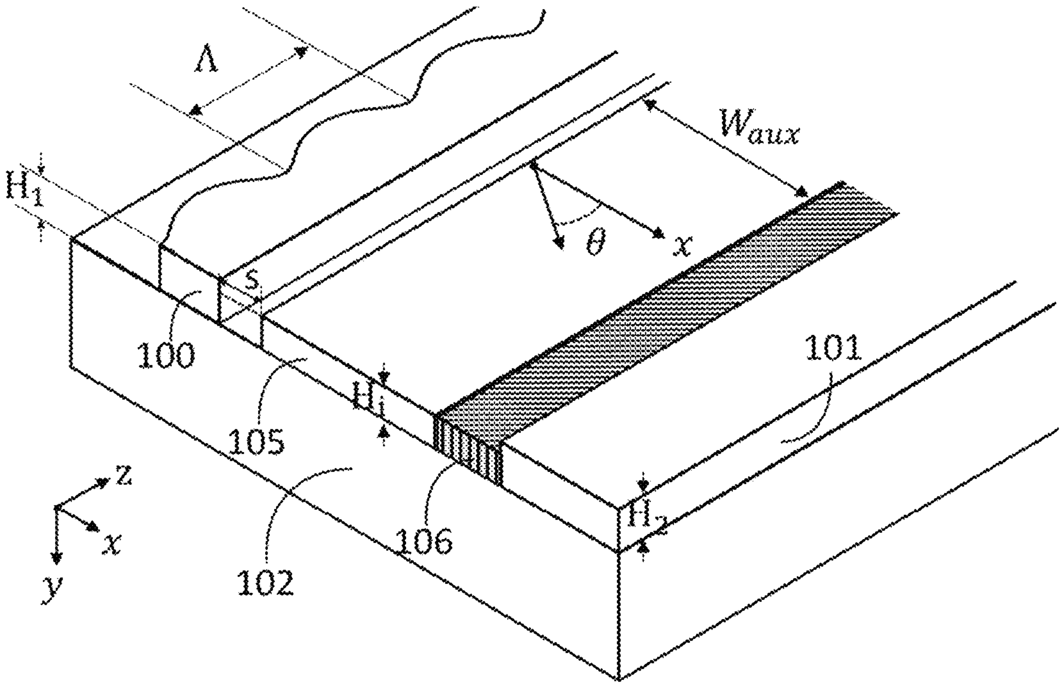
FIG. 5 shows a diagram of a second configuration of the single-beam deflector which diffracts the light from a periodic channel waveguide with effective refractive index $n_B$ towards a target film waveguide with effective refractive index $n_s$ greater than $n_B$. An auxiliary film waveguide and a mode matcher are used for that purpose.

FIG. 5 shows a second configuration of the essential part of the single beam deflector corresponding to a situation in which the target film waveguide (101) has an effective refractive index $n_s$ greater than the effective refractive index $n_B$ having the channel waveguide (100). In this configuration, to enable the single beam condition defined by expression (7) a new auxiliary film waveguide (105) having an effective refractive index $n_{aux}$ lower than that of the film waveguide must be interleaved. This waveguide should be of sufficient length $W_{aux}$ to ensure that the 0 order of diffraction has negligible coupling. Furthermore, to optimize the power transmission between the auxiliary waveguide (105) and the target film waveguide (101) a modal adaptation structure (106) of width $W_{adapt}$ can be inserted between them. This adaptation structure can preferably be implemented by means of a Graded Refractive Index or Graded Index (GRIN) transition.

Figure 6:
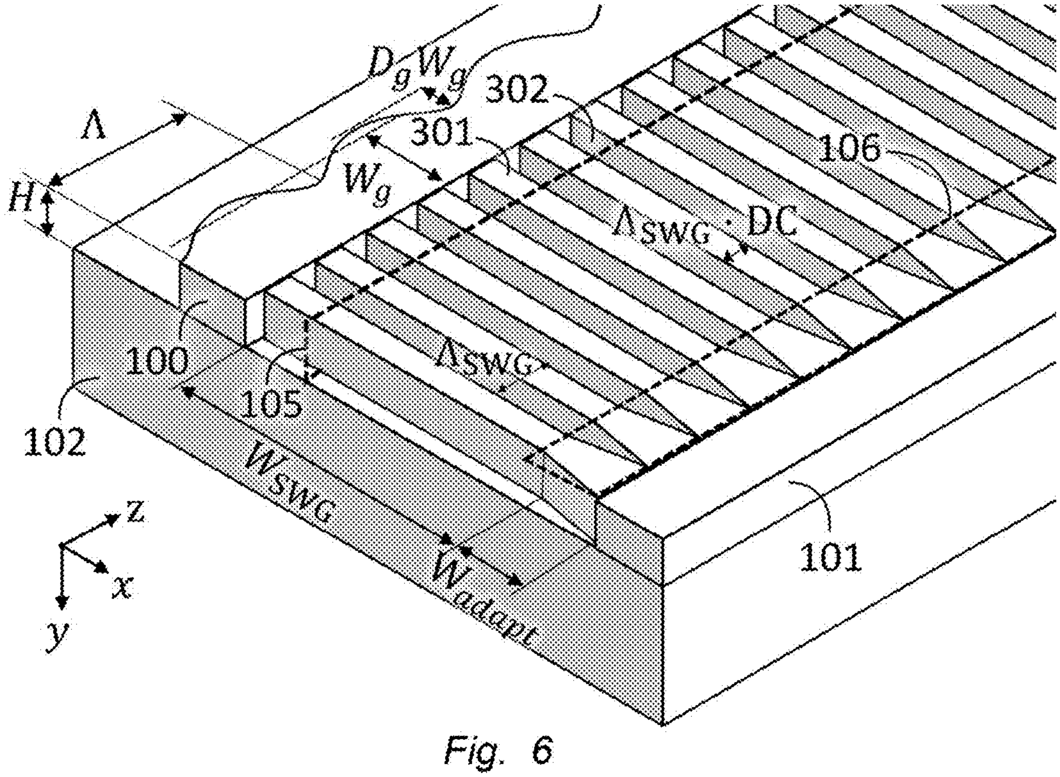
FIG. 6 shows a possible implementation based on the use of SWG metamaterials, in silicon-on-insulator technology, of the second configuration of the single-beam deflector which diffracts the light from a periodic channel waveguide with effective refractive index $n_B$ towards a film waveguide with effective refractive index $n_s$ greater than $n_B$ through an auxiliary film waveguide and a mode matcher.

FIG. 6 shows a preferred embodiment of the essential part of the second configuration of the single-beam deflector in silicon-on-insulator technology, corresponding to the event that the target film waveguide (101) has an effective refractive index $n_s$ greater than the effective refractive index of the guide of channel $n_B$ In this preferred embodiment, the auxiliary guide (105) and the modal adaptation structure (106) are performed by means of SWG metamaterials. This second configuration of the essential part of the single-beam deflector comprises:

- a channel waveguide in which it has been etched with a periodic side disturbance of period $\Lambda$ which, has been chosen to be sinusoidal type (100) in a non-limiting manner,
- an auxiliary film waveguide implemented by means of a subwavelength grating (SWG) metamaterial consisting of the intercalation of silicon blocks (301) and silicon dioxide gaps (302) along the direction of propagation. This means SWG is characterized by its period $\Lambda_{SWG}$, its duty cycle DC and its width $W_{SWG}$,
- a modal adaptation structure implemented by means of an SWG structure which synthesizes a gradual refractive index (106) and having a width $W_{adapt}$,
- a target silicon film waveguide (101), The design of the periodicity of channel guide A and of period $\Lambda_{SWG}$ and duty cycle DC of the auxiliary guide is carried out with considerations identical to those performed in the description of the first configuration of the single-beam deflector (FIGS. 1, 2, 3, and 4), with the fundamental design objective being to achieve the single-beam diffraction condition. Additionally, the width of the intermediate SWG film waveguide (101) $W_{SWG}$ must be set such that the 0 order power coupling towards the target film waveguide (101) is negligible. Once again, this can be done by means of simulation photonics by Floquet-Bloch mode analysis. To that end, the structure must be analyzed without disturbing and setting this width to a value which achieves an attenuation constant such that in the total length of the device, the fraction of power coupled to the target film waveguide by the 0 order is less than a predetermined value. In this embodiment, $W_{SWG}$ has been set at 3 μm for a deflector having a length of 100 μm (twice the target mode diameter) to filter less than 0.1% of the incoming power towards the target film waveguide.

The width of the area of adaptation of the gradual refractive index (106), $W_{adapt}$, must be large enough for the transmission of power from the auxiliary SWG film waveguide to the target film waveguide to not cause excessive losses due to radiation outside of the plane of the wafer or reflection. The design of this parameter is done immediately by single-period photonic simulation of the gradual refractive index region with an FDTD simulator supporting periodic-type boundary conditions. Thus, it was found that for a value of $W_{Adapt}$ of 2 μm the transmission of the SWG film waveguide to the target film waveguide is virtually lossless (>0.1 dB).

Figure 7:
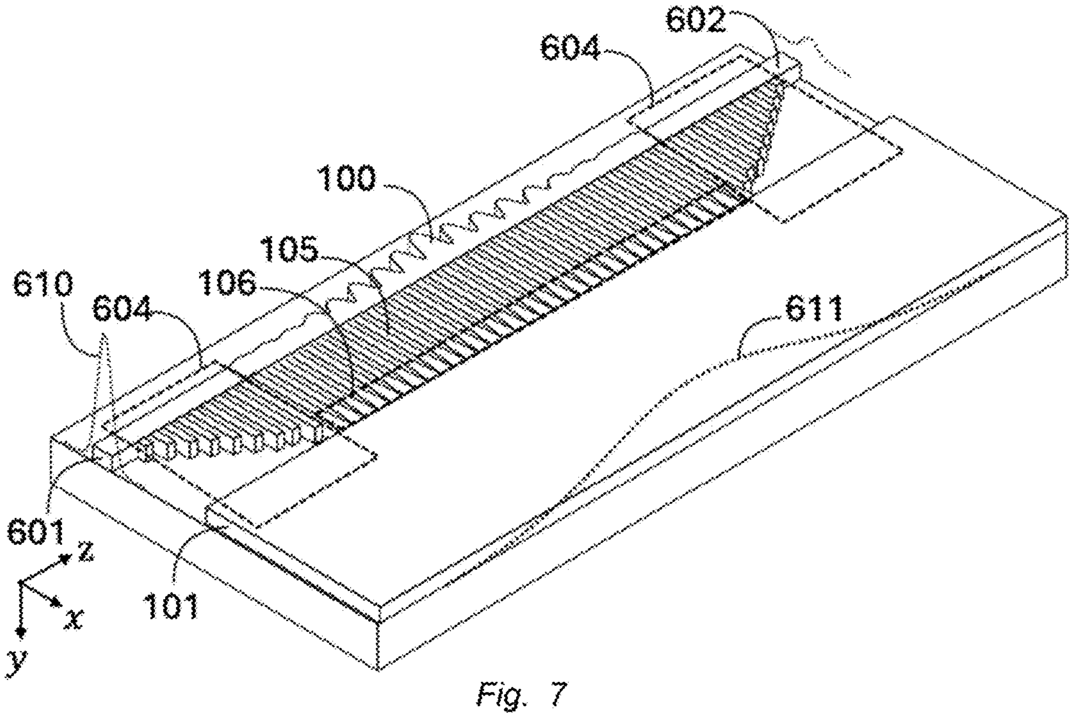
FIG. 7 shows a complete beam expander based on the concatenation of a plurality of single-beam deflector sections in which the geometry of each section is slowly modified along the device to shape the amplitude or the phase of the diffracted wave, the single-beam radiation condition being maintained in each section. The device consists of two standard channel guides for input and output, an adiabatic mode matcher between the input and output channel guides of the initial and final sections of the single-beam deflector, a plurality of single-beam deflector sections, where the geometry of the channel guide varies along the structure, an auxiliary film guide implemented by means of subwavelength structures, a modal adaptation structure implemented with subwavelength structures and a target film guide made of silicon.

FIG. 7 shows a schematic depiction of a preferred embodiment of the complete system, i.e., the first aspect of the invention: the single-beam deflector. This preferred embodiment is carried out in silicon-on-insulator technology for light polarized on the plane of the chip (commonly referred to as transverse electric TE polarization) at the wavelength of 1550 nm and uses an SWG metamaterial guide as an auxiliary guide. This deflector transforms the fundamental mode of a channel waveguide of the silicon-on-insulator platform of 500 nm (610) in a beam ~60 μm wide (611) guided through the target film guide (101). This device includes, in addition to the essential part of the single-beam matcher described above, two input and output matching sections (604) to match the mode of the silicon wire symmetrical channel guide, typically used in silicon photonics (601), to mode of an asymmetrical channel guide (100) appearing in the essential part of the single beam expander described in FIGS. 1, 2, 5 and 6.

The complete single-beam deflector system comprises:

- two conventional silicon wire channel waveguides implementing the input (601) and one of the outputs (602)
- two mode converters placed at the beginning (604) and at the end (604) of the deflector which match the geometry of the silicon wire type channel waveguide to the geometry of the essential part of the single-beam deflector,
- a channel waveguide which has been etched with an apodized sinusoidal type pattern (100) having a depth $D_g(z)$ and modulation period $\Lambda(z)$ that are modified along the device,
- an auxiliary film waveguide (105) implemented by means of a subwavelength grating (SWG) metamaterial consisting of the intercalation of silicon blocks and silicon dioxide gaps along the direction of propagation,
- a modal adaptation structure implemented by means of an SWG structure which synthesizes a gradual refractive index (106),
- a target film waveguide (101) constituting the output to where the generated single beam is diverted.

The mode matcher at the inlet and outlet 604 progressively introduces along the direction the SWG metamaterial that forms the film waveguide. For this purpose, silicon blocks of the same thickness and periodicity as those making up the SWG film waveguide are introduced, always attached to the channel waveguide on the side of the SWG film waveguide, the width of which varies so that at the beginning it is zero and at the end it is equal to the width of the SWG film waveguide. It should be noted that the variation of the width along the matcher can follow any type of function as long as it is done monotonically and smoothly to ensure adiabaticity. In this preferred embodiment, a linear type variation has been used for the sake of simplicity. The length of this transition has been set to 22 Inn to maximize the transfer to the fundamental Floquet-Bloch mode of the deflector.

The etching variation $D_g(z)$ defines the radiation force $\alpha(z)$ and this in turn defines the shape of the radiated field magnitude. Therefore, to achieve a given radiated field profile $|E_r(z)|$, the etch depth must be designed to synthesize the required radiation force which is determined by expression (8). In this preferred embodiment, the target radiated field is a Gaussian with a waist width or mode field diameter (MFD) of 50 μm, i.e.

$$|g(z)| = A_0 \cdot \exp\left(-\left(\frac{z}{MFD/2}\right)^2\right), \tag{14}$$

Figure 8:
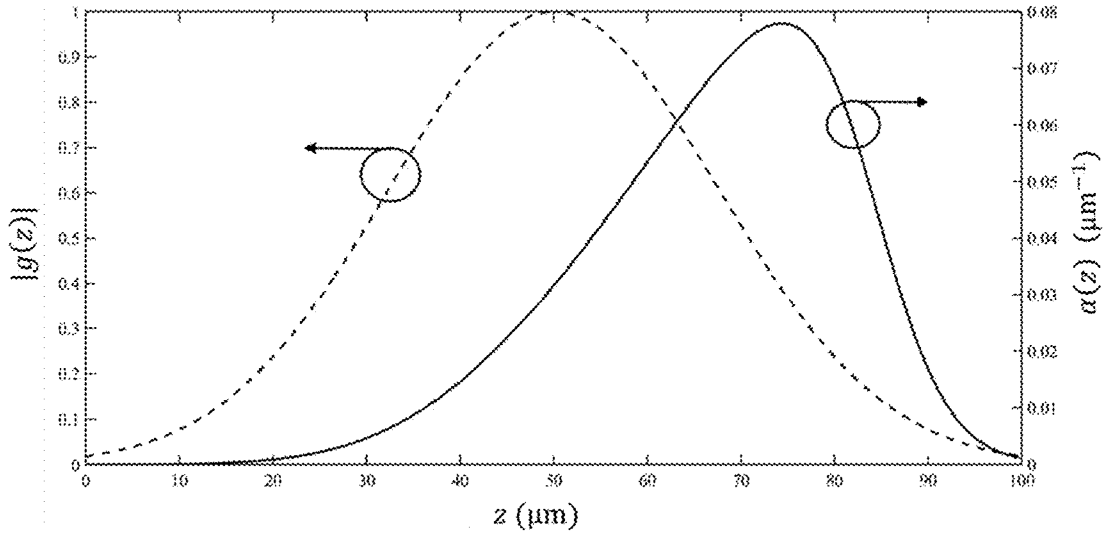
FIG. 8 shows the amplitude of the field profile desired to be implemented $|g(z)|$ and the radiation force $\alpha(z)$ needed to obtain same if it is assumed that 0.5% of the incoming power is not radiated and is transmitted to the end of the deflector.
Figure 9:
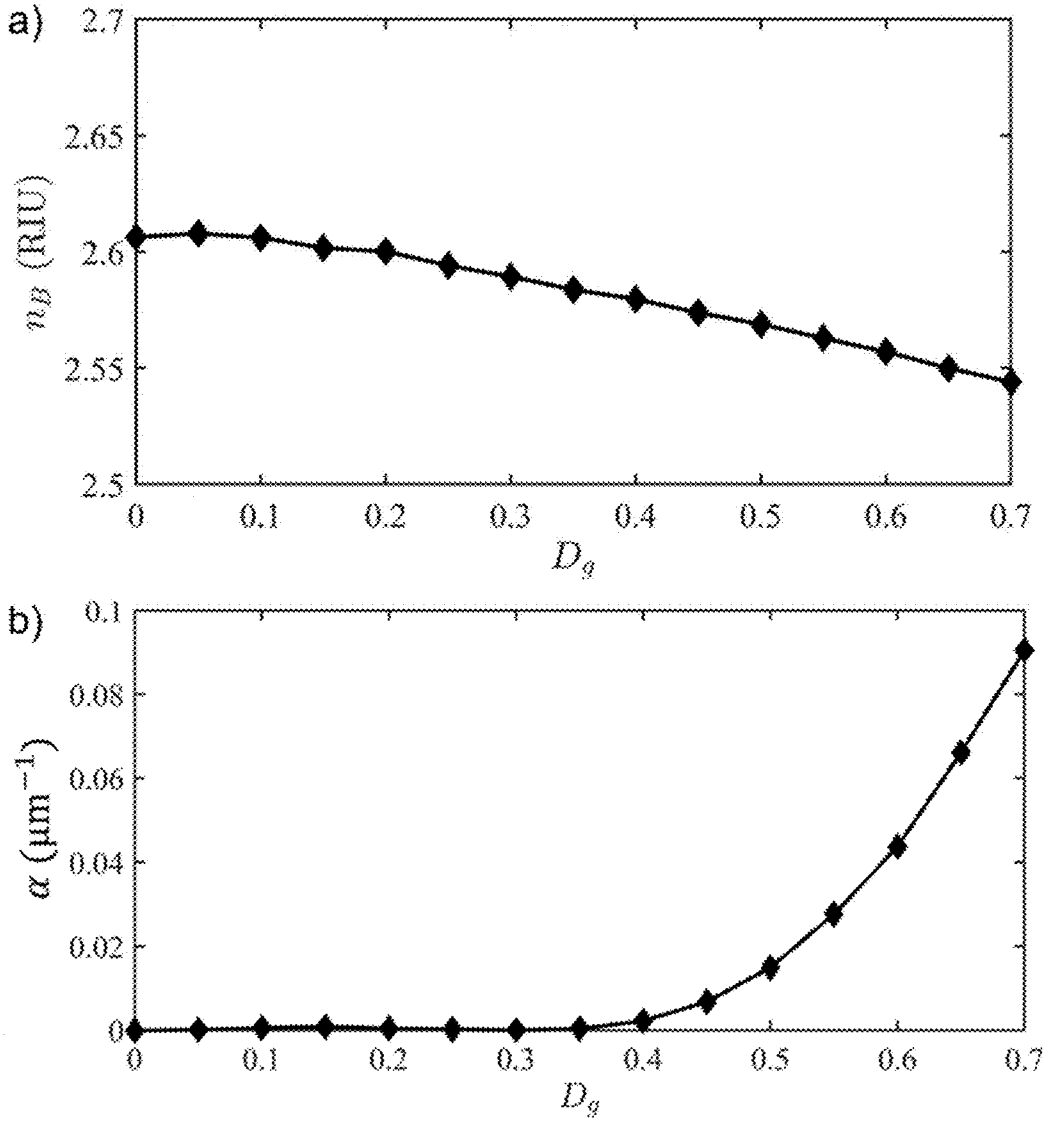
FIG. 9 shows the design curves of the sinusoidal pattern needed to achieve the desired beam. The curves have been obtained by means of Floquet mode analysis. a) Radiation force $\alpha$ based on the modulation depth $D_g$. b) Effective refractive index of the fundamental Floquet-Bloch mode based on the modulation depth D 9.
Figure 10:
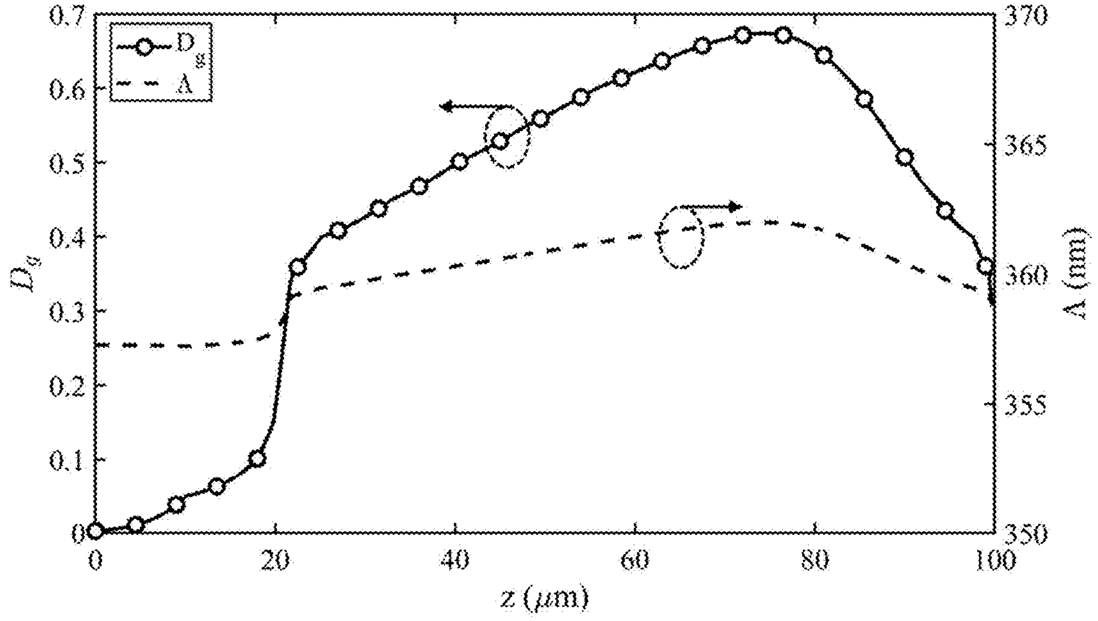
FIG. 10 shows the variation along the deflector of the sinusoidal geometric pattern (like the one shown in FIG. 6) needed to implement the field shown in FIG. 8.

FIG. 8 shows the shape of this radiated field and the radiation force variation achieved by this radiated field when 0.5% of the incoming power is allowed not to be radiated and transmitted to the silicon wire type output guide (602).

To find the variation of modulation depth $D_g(z)$ that allows implementing such a field, the one-period Floquet-Bloch mode analysis has been performed for different modulation depths $D_g$ in the range of (0,0.7) and both the effective refractive index variation (FIG. 9) and the variation in the radiated power undergone by the Floquet-Bloch mode have been obtained. Thus, with this variation and knowing the variation with the direction of propagation (z) that the radiation force required to implement the target radiated field (FIG. 8) must have, the modulation depth variation $D_g(z)$ shown in FIG. 10 can be designed. In this figure, the period variation that must be implemented to ensure that all elements radiate in the same direction is also shown. This is necessary since the fundamental Floquet-Bloch mode effective refractive index varies slightly with the modulation depth $D_g$. To compensate for this variation in effective refractive index $\Delta n_B$, it is necessary to introduce a variation in the period $\Delta\Lambda$ given by:

$$\Delta\Lambda = -\frac{\Lambda^2}{\lambda_0}\Delta n_B. \tag{15}$$

Figure 11:
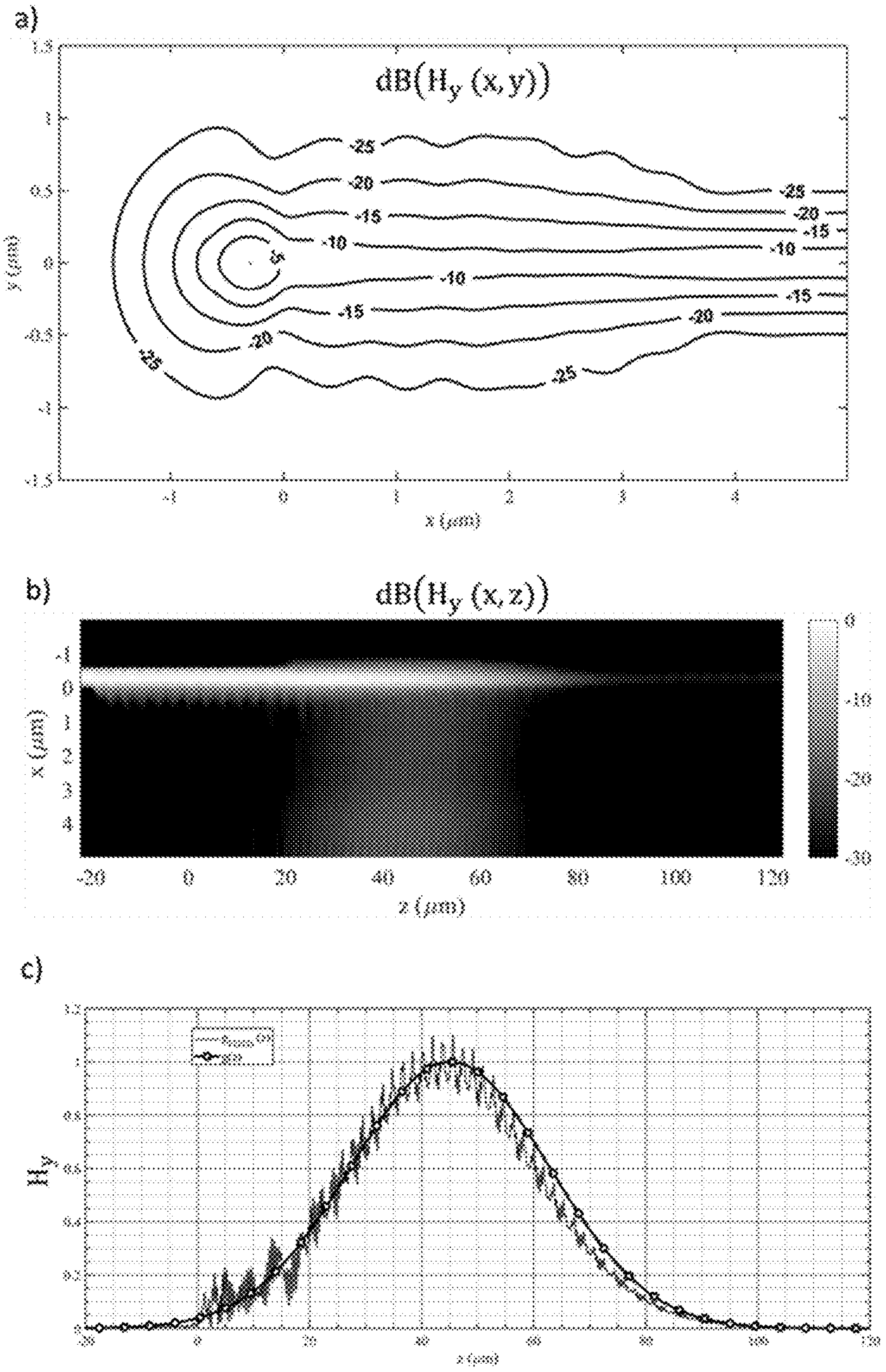
FIG. 11 shows the 3D FDTD simulation of the complete device. a) Cross-section of the magnetic field profile (plane XY) in the middle of the deflector which shows how the light is redirected from the channel guide to the SWG film guide. b) Propagation of the magnetic field in the plane XZ at the middle thickness of the channel guide. c) Comparison of the magnetic field of the 3D FDTD simulation $g_{FDTD}(Z)$ along the discontinuous line shown in FIG. 11(*b*) and the target field g(z) shown in FIG. 8.

FIG. 11 shows the field profile obtained when the designed beam expander is analyzed by a 3D FDTD vector simulator. It is clearly observed that the field is directed from the channel waveguide core to the SWG film waveguide and later transferred to the target film waveguide. Likewise, it is also observed how the radiated field has a shape quite similar to the field that was defined as the target.

Dynamically Controllable Single-Beam Deflector

Figure 12:
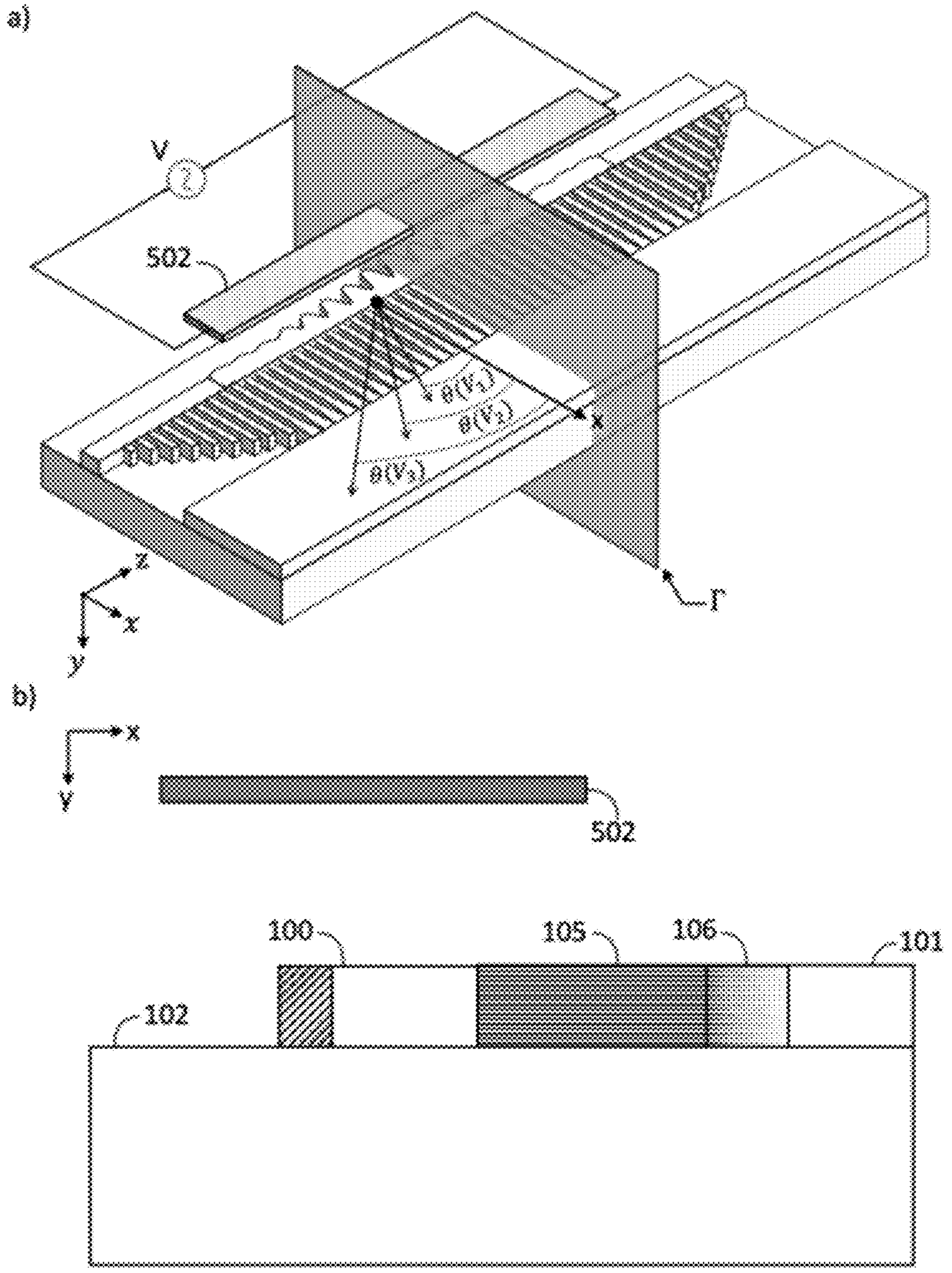
FIG. 12 shows a beam expander based on a single-beam deflector the beam angle $\theta$ of which is electrically controlled by a signal V by means of a thermo-optic modulator (heater) placed on the channel waveguide. a) Perspective view. b) Section along the plane $\Gamma$ as shown in a).

FIG. 12 shows a preferred embodiment of the second aspect of the invention, a single-beam deflector having a direction of the diffracted beam which can be adjusted dynamically by means of using a phase modulator on the channel guide of the deflector. Specifically but in a non-limiting manner, this preferred embodiment is based on the use of thermo-optic modulators such as those existing in the state of the art. FIG. 12*a* shows the general diagram of the invention on silicon-on-insulator technology, which consists of a single-beam deflector (similar to that described in FIG. 7) on which a strip of a resistive conductive material (typically Ti or a Ti and W alloy) has been superimposed. Said strip can be electrically fed by means of a current which, due to the Joule effect, heats the surrounding area. Since the geometry of the strip is invariable with the direction of propagation (z), the application of a control signal (V) will cause a uniform heating along the device. The heating of the optical material generates a small variation of the effective refractive index of the silicon material constituting the core of the channel guide of the deflector, which in turn causes a variation in the effective refractive index of the Floquet-Bloch mode which propagates through the structure. This variation in the index of the mode, which in this case and in a non-limiting manner has been assumed to be homogeneous along the entire length of the deflector, causes the variation of the angle of diffraction of the beam. Therefore, by acting on the electric current circulating through the heater it is possible to modify the dissipated electric power and, therefore, modify the angle of deflection of the beam generated in the film guide.

FIG. 12*b* shows a cross-section of the structure. The height at which the conductive strip is located must be chosen as a compromise between: increasing heating efficiency, which requires a small distance between the conductive strip and the core of the channel guide, and avoiding optical losses by interaction of the optical field with the guide, which requires a large distance between the conductive strip and the silicon core of the guide. A 2 μm distance between the heating strip and the silicon core of the guide provides a good engineering solution in this specific preferred embodiment.

By using a typical (TiW) heater technology with a width of 4 microns, located 2 μm above the guide, by means of thermal simulations it is possible to calculate that the electrical energy required to raise each μm of the core of the channel guide one degree K is approximately $$\sigma_{TH} = 10\frac{\mu W}{\mu m \cdot K},$$

i.e., an electrical power of 10 μW is needed to heat each μm of the core of the channel guide one degree K. Taking into account that the total length of the device for this specific embodiment is about L=160 μm, that the thermo-optic coefficient of silicon is $$\frac{dn_{si}}{dT} = 1.86\ 10^{-4}(RIU/K)$$

and that it is possible to approximate the thermal variation of the effective refractive index of the mode by that of silicon $$\frac{dn_{si}}{dT} = \frac{dn_B}{dT},$$

it is possible to estimate the electrical power required to vary the refractive index of the guided mode as $$\frac{dP_e}{dn_B} = \frac{\sigma_{TH} L}{\frac{dn_{si}}{dT}} = 8.6 \cdot 10^6 \frac{\mu W}{RIU} \tag{16}$$

Finally, the angular scanning efficiency with electrical power can be calculated by applying the known chain rule $$\frac{d\theta}{dP_e} = \frac{d\theta}{dn_B}\frac{dn_B}{dP_e} \tag{17}$$

and taking into account the equation (11) for the specific case of this design, obtaining for this case an approximate scanning efficiency of $$\frac{d\theta}{dP_e} = 2.86 \cdot 10^{-3} \text{ degrees/mW} \tag{18}$$

This shows that the single-beam deflector allows efficiently modifying the angle of the diffracted beam on the plane of the chip with an efficiency of $2.86 \cdot 10^{-3}$ degrees per mW of electrical power consumed for a very wide transverse beam.

Wavelength Multiplexer/Demultiplexer Based on a Single-Beam Deflector

Figure 13:
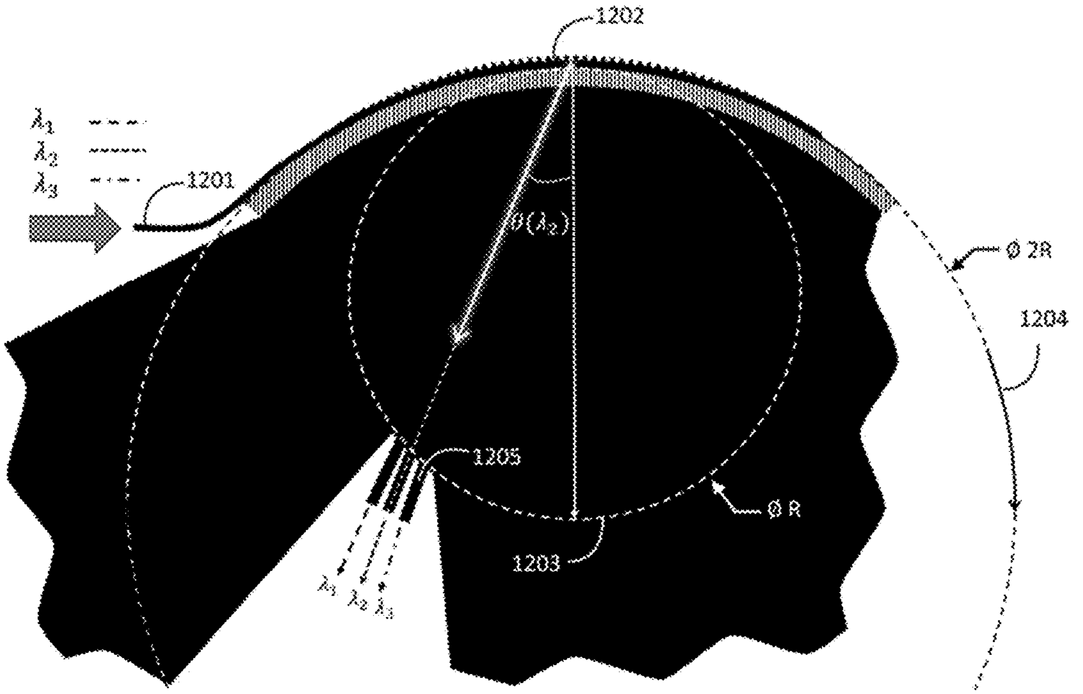
FIG. 13 shows the geometry of the demultiplexer based on a single-beam deflector located on a circle in a beam focusing configuration. The beam diffracted by the deflector within the silicon film waveguide has been designed so that the image that is formed on the Rowland circle has the same size and characteristics as the fundamental mode of the receiver guides. By way of illustration, it is shown as an example how three different wavelengths are focused in different guides, producing the wavelength demultiplexing effect.

FIG. 13 schematically shows a preferred embodiment of a demultiplexer formed by a single-beam deflector (1202) which is arranged following a circle (1204) with a radius R. Preferably, the device is implemented in the silicon-on-insulator platform with a 220 nm thick silicon layer placed on a silicon dioxide substrate and covered by a silicon dioxide cladding. FIG. 13 shows in black the regions that are not etched, i.e., the regions where there is a 220 nm silicon layer, and in white the regions where the silicon layer has been removed. The beam radiated by the deflector (1202) is transmitted, through an SWG auxiliary film waveguide and a graded refractive index matcher, to a target film waveguide of silicon material. Within the target film waveguide, the radiated beam is focused as it propagates. In addition, the focal spot is varied with the wavelength of the light entering the device. This is what allows the different wavelengths to be separated. The focal points for the different wavelengths are located on the Rowland circle (1203). The Rowland circle is a circle that: 1) has radius R/2, half the radius R of the circle on which the deflector is placed, 2) is inside the circle on which the deflector is placed and 3) these two circles, the Rowland circle and the deflector circle, are tangent to each other at the position of the deflector where the deflector has radiated half of the total radiated power.

In this preferred embodiment, the demultiplexer is targeted to have 5 channels, spaced 10 nm apart and centered around the 1550 nm wavelength. Also, the crosstalk between adjacent channels is desired to be less than −25 dB. The input and output signals will use transverse electric (TE) polarization.

The arc occupied by the grating has been set to $\phi_G = 0.3\pi$ rad. Moreover, the beam radiated by the deflector is set to a windowed Gaussian. The semi-width of this Gaussian $MFR_G$ is set to one fourth of the total length of the deflector $MFR_G = \phi_G \cdot R/4$. That is, on the curve of the deflector the magnitude of the field is given by $$g(s) = A_0 \cdot \exp\left(-\frac{s^2}{MFR_G}\right).$$

This diffracted field will give rise in the focal point to another Gaussian with a semi-width $MFR_\xi$ of 0.74 μm which requires a guide 2.1 μm wide to efficiently capture it. For this reason, the width of the receiver channel waveguides has been set to 2.1 μm.

To ensure the desired level of crosstalk (<−25 dB), the receiver waveguides are placed on the Rowland circle separated by $W_s = 2.8$ μm. This separation and the radius of the circle on which the deflector is placed set the separation between channels of the demultiplexer. This is because a variation in the wavelength $\delta\lambda$ is transferred directly to a displacement of the focal point on the Rowland circle $\delta\xi$. The proportionality constant between these two displacements is given by the angular dispersion of the demultiplexer $D = \partial\theta/\partial\lambda$ and the radius of the circle on which the deflector R is placed. Therefore, the following is true $$\delta\xi = D \cdot R \cdot \delta\lambda.$$

Moreover, deriving expression (12) with respect to the wavelength gives the angular dispersion of the demultiplexer:

$$D = \frac{\partial\theta}{\partial\lambda} = \frac{1}{n_s\cos(\theta)}\left(-\frac{1}{\Lambda} + \frac{\partial n_B}{\partial\lambda} - \frac{\partial n_s}{\partial\lambda}\sin(\theta)\right)$$

Therefore, for the channels to be separated $\Delta\lambda$ in wavelength at the same time that the receiving waveguide is separated $W_s$ the radius of the circle on which the deflector is placed must be set to $$R = \frac{W_s}{D \cdot \Delta\lambda}.$$

For the exemplary device set forth herein, $D \approx 0.0016$ rad/nm and therefore the radius of the circle of the deflector R must be 177 μm. With this radius, the length of the deflector $L_g$, without the modal adapters, must be $L_g = 167$ μm and the radiated field must have a Gaussian profile with a width of 42 μm. To synthesize this field, it is necessary to use the method explained for the first preferred embodiment.

Lastly, as many output receiver waveguides must be positioned as channels are desired in the demultiplexer. Thus, the receiving channel waveguide corresponding to the channel the central wavelength of which is A, should be positioned on the Rowland circle as explained below. The midpoint of the interface of the receiving channel waveguide with the silicon channel waveguide should be placed at the intersecting point of:

the Rowland circle, and the straight line forming an angle $\theta(\lambda_c)$ with the circle of the deflector and passing through the point of this circle in which the deflector has radiated half of the total radiated power, and the axis of propagation of the channel waveguide must be aligned with the straight line described above.

Figure 14:
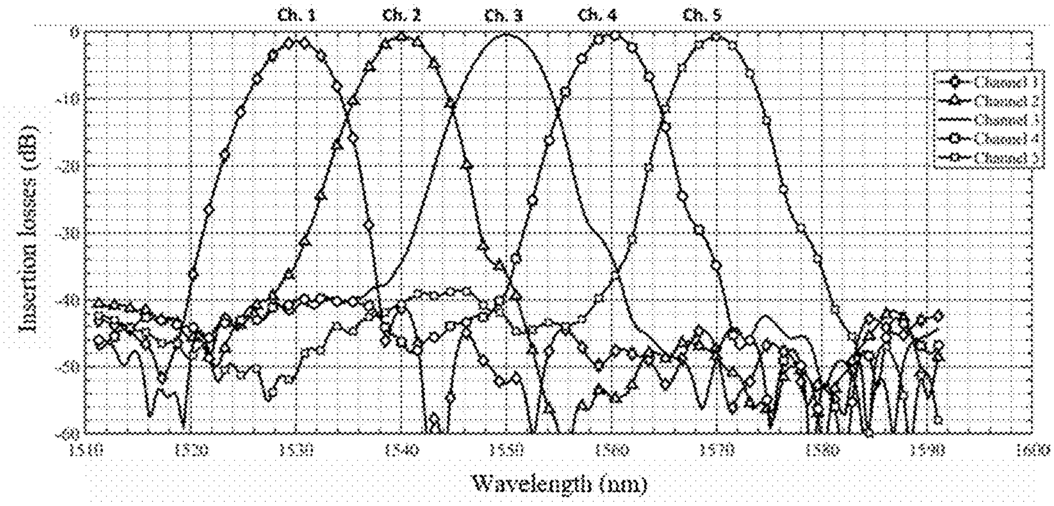
FIG. 14 shows the transmission from the input guide to 5 outlet guides of a demultiplexer of wavelengths based on a single-beam deflector. The demultiplexer consists of 5 channels separated 10 nm from one another around the wavelength 1550 nm.

FIG. 14 shows the transmission of the described device, from the input port (1201) to each of the output ports (1205), obtained by means of an FDTD simulation. It can be seen how both the separation and the level of crosstalk are consistent with the values established in the design requirements. Furthermore, as a result of the high efficiency of the deflector, the insertion loss is sub-decibel for all 5 channels.

Figure 15:
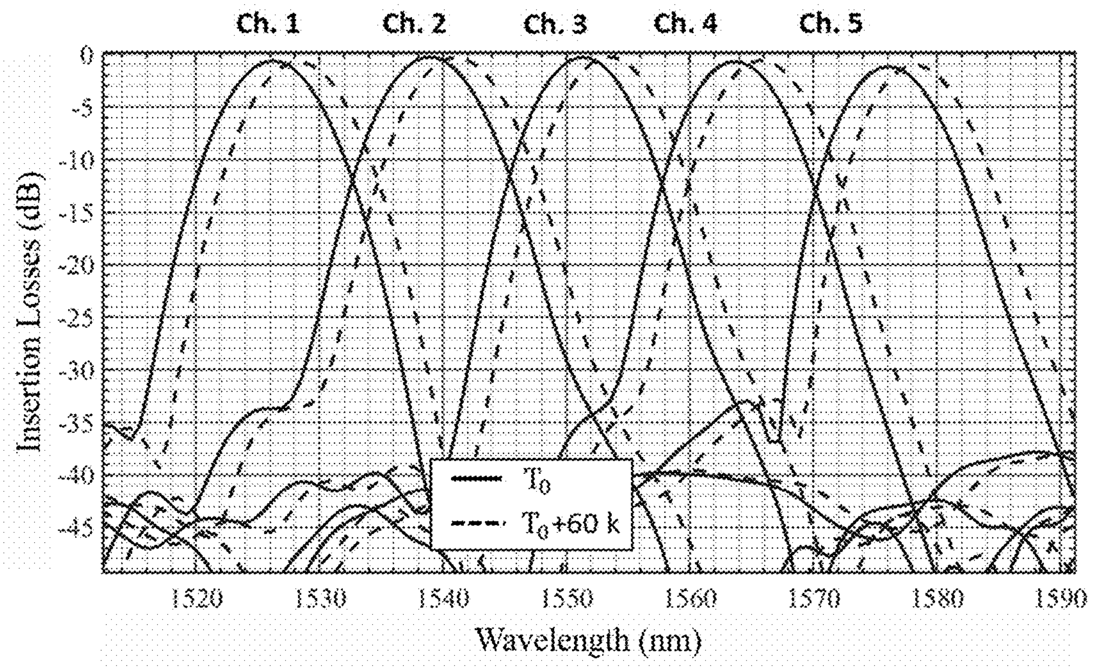
FIG. 15 shows the transmission from the input guide to 5 outlet guides of a wavelength demultiplexer based on a single-beam deflector. The demultiplexer consists of 5 channels separated 10 nm from one another around the wavelength 1550 nm. This figure shows the transmission when a control signal is not applied on the thermo-optic modulator (with the channel guide therefore being at room temperature $T_0$) and when heating of the channel guide takes place 60 K above room temperature due to the application of a control signal on the thermo-optic modulator.

The described device can be immediately conferred tuning capability to correct manufacturing errors and ensure that the channels are at the desired wavelengths. To that end, for example, a heater (502) can be placed above the channel waveguide (100) to control the direction in which the beam θ propagates within the film waveguide. This configuration is shown in FIG. 12, where a side deflector with a heater is shown. The effect of heating the channel waveguide on the response of the demultiplexer is shown in FIG. 15. This figure shows how the demultiplexer response moves when it is heated 60 K. This heating produces a movement in the response of the demultiplexer of about 3 nm, thus demonstrating the possibility of thermal adjustment. This heating would require an electrical consumption of about 96 mW of power. This means that only 32 mW have to be expended to move the response of the device 1 nm. It is important to note that this energy efficiency value significantly improves the values reported to date in the state of the art of thermally adjustable demultiplexers implemented on the SOI platform.

Optical Antenna Fed by a Single-Beam Deflector

FIG. 16*a* schematically shows an example of an integrated optical antenna fed by a single-beam side deflector. The light entering the single-beam deflector is coupled to a film waveguide in the form of a wide Gaussian beam. This Gaussian beam feeds a vertical diffraction grating defined within the film waveguide (1402). This vertical diffraction grating functioning as an optical antenna radiates a directive beam out of the chip (1404). Note that like the proposed demultiplexer, in this configuration the direction of propagation of the beam generated by the deflector within the film waveguide θ can be controlled by wavelength and/or modulation of the effective refractive index of the channel waveguide.

In this configuration the deflector performs a dual function; on the one hand it expands the beam and shapes it to fit the width of the diffraction grating, and on the other hand the direction in which the beam radiates directly controls the direction in which the antenna radiates.

Note that this type of feed makes it possible to achieve very narrow pixels by simply widening the diffraction grating that implements the antenna and redesigning the deflector to generate an equally wide beam. Furthermore, in this configuration there are no secondary lobes that are observed in other types of steerable antennas formed by groups of radiating elements (arrays). This is because in this case there is only one radiating element (the diffraction grating).

On the other hand, and homologous to the proposed demultiplexer, this antenna fed by a single beam deflector allows directing the beam that is radiated out of the plane of the chip in two independent dimensions controlled by the wavelength and the modulation of the effective refractive index of the channel waveguide.

Figure 16:
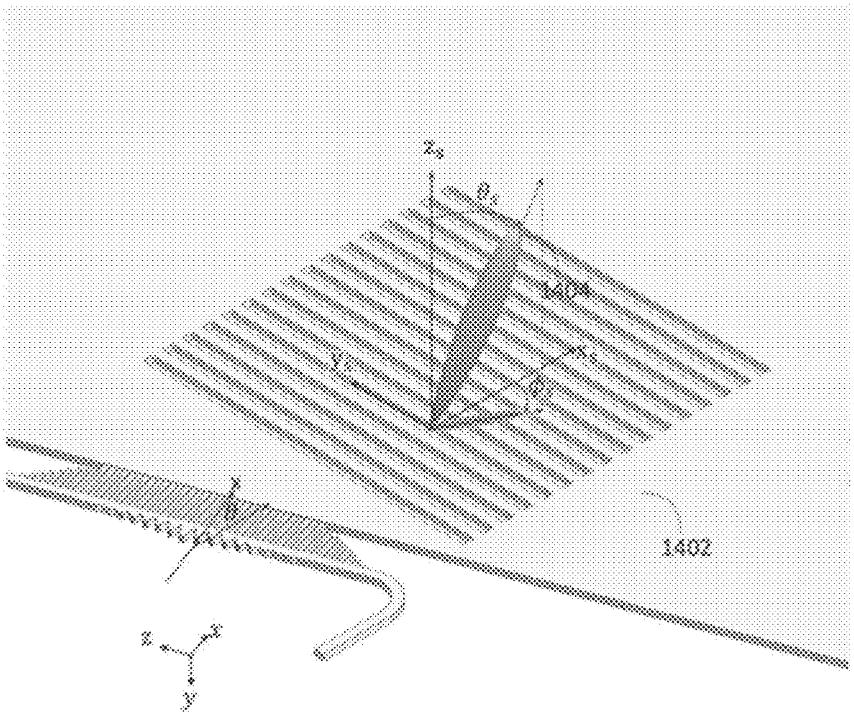
FIG. 16 a) shows a simplified diagram of an optical antenna fed by a single-beam side deflector. b) Variation of the direction in which the antenna radiates the beam with the wavelength (discontinuous line) and with the temperature (color map).
Figure 16:
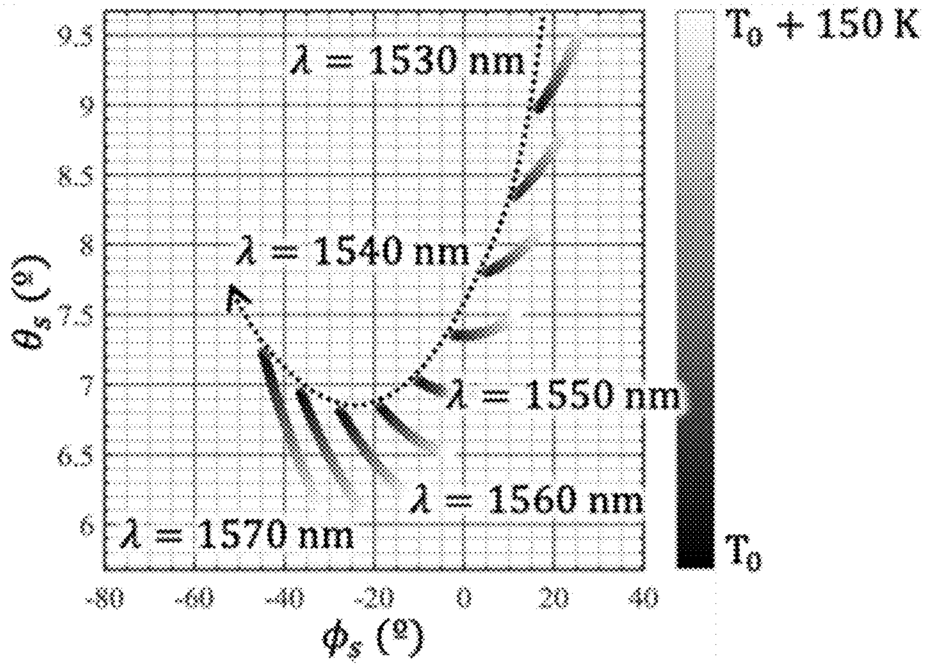

FIG. 16.*b* shows by way of example the variation of the radiation direction out of the chip when the deflector proposed as a preferred embodiment of the second aspect of the invention (FIG. 12) is used to feed a vertical diffraction grating. It is observed how both a change in wavelength and a change in temperature (induced by an electrically controlled heater) move the pointing direction of the beam diffracted by the grating. Therefore, this invention allows simultaneous control of the two beam pointing angles ($\theta_s$, $\phi_s$) by acting in a controlled manner on the operating wavelength and on the control signal of the thermo-optic modulator.

Figure 17:
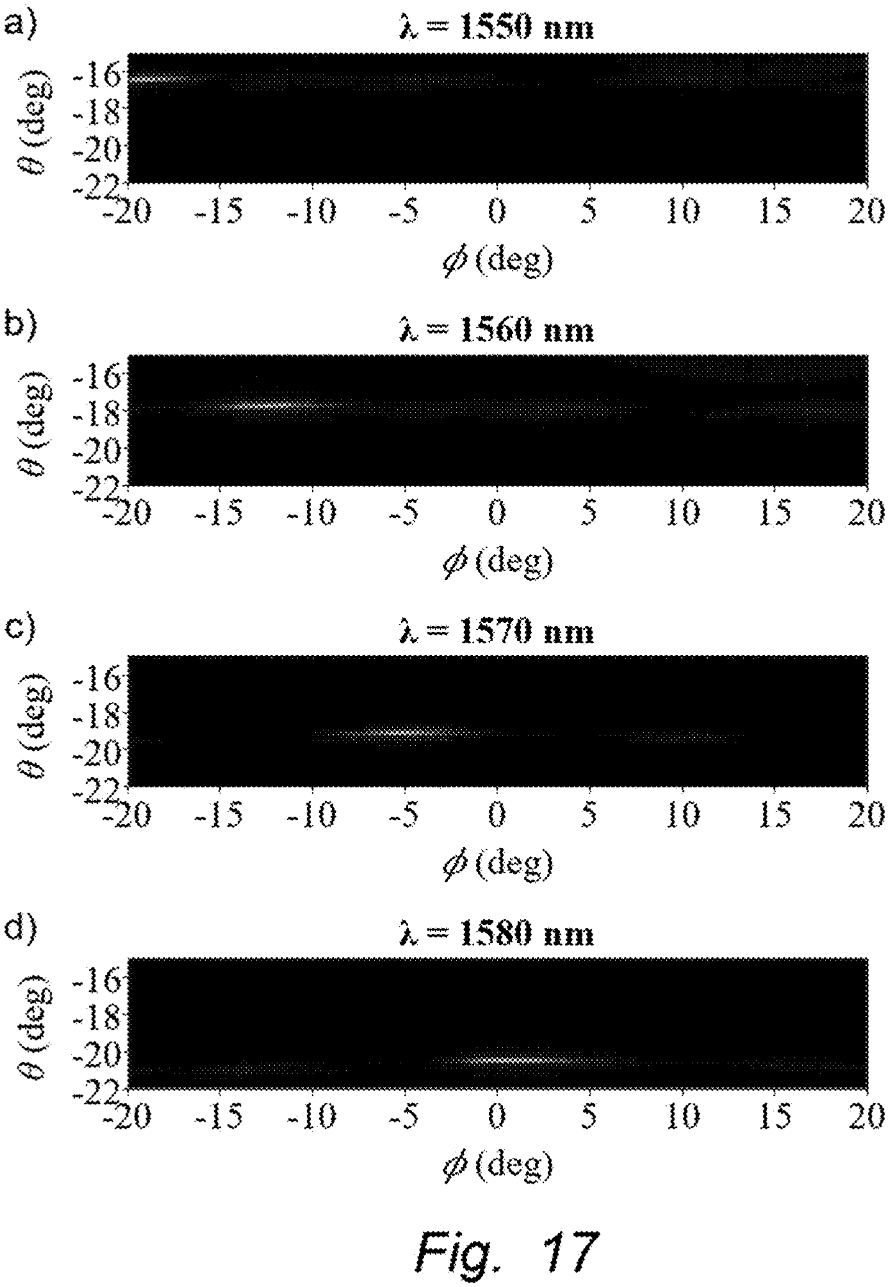
FIG. 17 shows a measured radiation pattern of an integral optical antenna fed with a single-beam side deflector for several feed wavelengths: a) 1550 nm b) 1560 nm c) 1570 nm d) 1580 nm.
Figure 18:
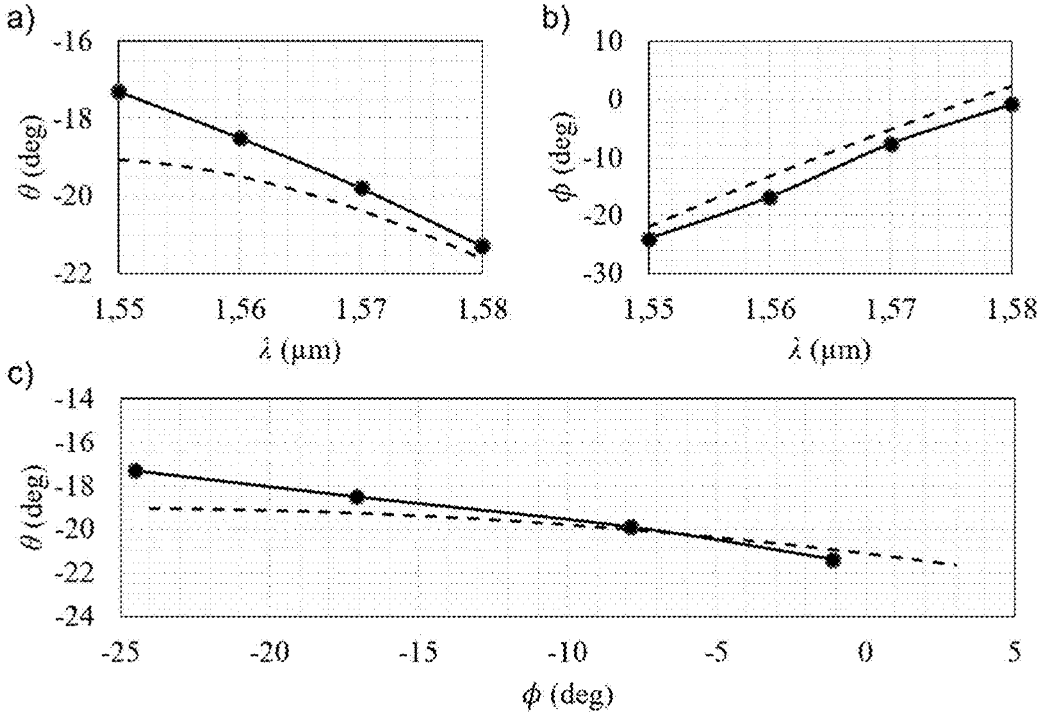
FIG. 18 shows a direction in which an integrated optical antenna fed with a single-beam side deflector radiates the main beam based on the wavelength. The experimental measures are compared with electromagnetic simulations: a) Variation of the elevation $\theta_s$ of the radiation direction with the wavelength. b) Variation of the azimuth $\phi_s$ of the radiation direction with the wavelength. c) Path followed by the radiated beam in the plane $\theta_s$-$\phi_s$ as the wavelength varies.

An initial prototype has been manufactured to experimentally evaluate the variation of direction as a function of wavelength in an integrated optical antenna. The far-field measurements of this prototype are shown in FIGS. 17 and 18. FIGS. 17*a*-17*d* show the radiation patterns for four different wavelengths (1550 nm, 1560 nm, 1570 nm, and 1580 nm). FIGS. 18*a* and 18*b* show the variation of the azimuth ($\phi_s$) and elevation ($\theta_s$) of the main radiation direction as a function of wavelength obtained from measurements and compares it with that obtained by simulation. FIG. 18*c* shows the path followed by the radiation direction in the $\phi_s$-$\theta_s$ plane obtained by means of experimental measurements and that predicted by simulation.

In this text, the word "comprises" and variants thereof such as "comprising", etc., must not be interpreted in an exclusive manner, i.e., they do not exclude the possibility that what is described may include other elements, steps, etc.

Moreover, the invention is not limited to the specific embodiments which have been described but rather also encompasses, for example, the variants which may be carried out by one skilled in the art, for example, with respect to the choice of materials, dimensions, components, configuration, etc., within the scope of what is inferred from the claims.

The invention claimed is:

1. A method that comprises: providing a single-beam side deflector comprising: a channel waveguide, a target film waveguide, a substrate on which the channel and target film waveguides are supported, and a cladding covering the channel and target film waveguides; and inputting an optical signal with a working wavelength and polarization in the channel waveguide; wherein:

the channel waveguide comprises a periodic disturbance with period Λ and has an effective refractive index $n_B$ corresponding to a fundamental Floquet-Bloch mode for the working wavelength and polarization;

the target film waveguide has an effective refractive index $n_s$ for a direction of propagation parallel to the channel waveguide;

the substrate has a refractive index $n_a$;

the cladding has an effective refractive index $n_c$;

wherein the effective refractive indexes of the channel and target film waveguides, the effective refractive indexes of the cladding and of the substrate, the periodicity Λ and the working wavelength λ are all related to one another such that they satisfy the single-beam diffraction conditions $$-n_s < n_B - \frac{\lambda}{\Lambda} < -n_\alpha \text{ and } -n_B < n_s - \frac{\lambda}{\Lambda} < -n_c$$

for light diffracted by the channel waveguide to be captured by the target film waveguide, preventing diffraction towards the cladding and the substrate.

2. The method according to claim 1, wherein the target film waveguide is formed by a subwavelength grating, SWG, metamaterial made up of a plurality of sections of a core material and a plurality of sections of a cover material, respectively arranged alternately in a periodic manner with a period less than the wavelength of a light propagated through said region.

3. The method according claim 1, wherein the single-beam side deflector further comprises an auxiliary film waveguide intercalated between the channel waveguide and the target film waveguide; wherein the effective refractive index $n_s$ is greater than the effective refractive index $n_s$ of the Floquet-Bloch mode to be propagated in the channel waveguide; wherein the auxiliary film waveguide has an effective refractive index $n_{aux}$ in a direction of propagation parallel to the channel waveguide less than the effective refractive index $n_B$ of the Floquet-Bloch mode to be propagated in the channel waveguide; wherein the effective refractive indexes of the channel and auxiliary film waveguides, the refractive indexes of the cladding and of the substrate, the periodicity Λ, and the working wavelength λ are all related to one another such that they satisfy the single-beam diffraction conditions $$-n_{aux} < n_B - \frac{\lambda}{\Lambda} < -n_\alpha \text{ and } -n_{aux} < n_s - \frac{\lambda}{\Lambda} < -n_c$$

for light diffracted by the channel waveguide to be captured by the auxiliary film waveguide, preventing diffraction towards the cladding and the substrate; wherein the auxiliary film and target film waveguides are located so as to allow the direct transfer of power from the auxiliary film waveguide to the target film waveguide; and wherein the auxiliary film waveguide has a width configured to prevent the direct transfer of power from the channel waveguide to the target film waveguide.

4. The method according to claim 3, wherein the deflector further comprises a modal adaptation structure between the auxiliary film waveguide and the target film waveguide to promote the transmission of power from the auxiliary film waveguide to the target film waveguide.

5. The method according to claim 3, wherein the auxiliary film waveguide is formed by a subwavelength grating, SWG, metamaterial made up of a plurality of sections of a core material and a plurality of sections of a cover material, respectively arranged alternately in a periodic manner with a period less than the wavelength of a light propagated through said region.

6. The method according to claim 1, wherein providing the single-beam side deflector comprises: providing a concatenation of sections of single-beam side deflectors; wherein the sections are concatenated in the direction of propagation of the optical signal through the channel waveguide, and a geometry of the channel waveguide is configured to shape at least one of an amplitude a phase of a diffracted wave, the single-beam radiation condition being maintained in each section.

7. The method according to claim 1, which further comprises: providing a modulator along the channel waveguide of the deflector to modify the effective refractive index of the channel waveguide by means of one or more of thermo-optic modulators, electro-optic modulators, plasma dispersion modulators, or electro-acoustic modulators; and dynamically controlling, by means of the modulator provided, an angle used to diffract the single beam in the target film waveguide.

8. The method according to claim 1, wherein a plurality of concatenated modulator sections are provided along the direction of propagation of the channel waveguide, each of said modulator sections having an electronic control signal for modifying at least one of an attenuation and an effective refractive index of the respective modulator section.

9. The method according to claim 1, which further comprises: providing a wavelength multiplexer/demultiplexer; wherein at least one optical signal is input in the multiplexer/demultiplexer; wherein the multiplexer/demultiplexer comprises: the single-beam side deflector provided; a curved support on which the deflector is arranged for generating a beam which is focused inside the target film waveguide of the deflector; and a plurality of receiver channel waveguides located at points of the target film waveguide in which the diffracted beam is focused for different wavelengths, such that by changing the working wavelength, the beam is predominantly focused in one of the receiver waveguides capturing the light.

10. The method according to claim 7, which further comprises: providing a wavelength multiplexer/demultiplexer; wherein at least one optical signal is input in the multiplexer/demultiplexer; wherein the multiplexer/demultiplexer comprises: the single-beam side deflector provided; a curved support on which the deflector is arranged for generating a beam which is focused inside the target film waveguide of the deflector; and a plurality of receiver channel waveguides located at points of the target film waveguide in which the diffracted beam is focused for different wavelengths, such that by changing the working wavelength, the beam is predominantly focused in one of the receiver waveguides capturing the light; and wherein the method further comprises: dynamically controlling at least one of an attenuation and an effective refractive index of the channel waveguide.

11. The method according to claim 1, which further comprises: providing an optical antenna feeder; wherein the at least one optical signal is input in the feeder; wherein the feeder comprises: the single-beam side deflector provided; and a diffraction grating etched on the target film waveguide of the deflector; wherein the deflector and the diffraction grating are arranged for a generated beam to strike the diffraction grating.

12. The method according to claim 11, wherein a combined actuation on the working wavelength and on a control signal of the modulator of the single-beam side deflector allows simultaneous control of the two beam pointing angles.

13. The method according to claim 11, wherein the feeder further comprises a curved support on which the single-beam deflector is arranged, the curved support having a focusing or defocusing curve for focus adjustment and collimation of a beam diffracted by the deflector.

14. A device comprising a single-beam side deflector, the single-beam side deflector comprising:

a channel waveguide for receiving an input optical signal, comprising a periodic disturbance with period Λ;

a target film waveguide, having an effective refractive index $n_s$ for a direction of propagation parallel to the channel waveguide;

a substrate on which the channel and target film waveguides are supported and having a refractive index $n_a$;

a cladding covering the channel and target film waveguides and having a refractive index $n_c$;

wherein the direction with which the −1 order of diffraction is diffracted within the target film waveguide forms an angle θ with respect to the direction normal to the direction of propagation within the channel waveguide, θ being greater than $\arcsin(\max\{n_a, n_c\}/n_s)$ for light diffracted by the channel waveguide to be captured by the target film waveguide, preventing diffraction towards the cladding and the substrate.

15. A device comprising a single-beam side deflector, the single-beam side deflector comprising:

a channel waveguide, for receiving an input optical signal, comprising a periodic disturbance with period Λ and having an effective refractive index $n_B$ corresponding to a fundamental Floquet-Bloch mode;

a target film waveguide, having an effective refractive index $n_s$ which is greater than the effective refractive index $n_B$ of the Floquet-Bloch mode to be propagated in the channel waveguide;

an auxiliary film waveguide intercalated between the channel waveguide and the target film waveguide and having an effective refractive index $n_{aux}$ in a direction of propagation parallel to the channel waveguide less than the effective refractive index $n_s$ of the Floquet-Bloch mode to be propagated in the channel waveguide;

a substrate on which the channel and target film waveguides are supported and having a refractive index $n_a$;

a cladding covering the channel and target film waveguides and having a refractive index $n_c$;

wherein the direction with which the −1 order of diffraction is diffracted within the target film waveguide forms an angle θ with respect to the direction normal to the direction of propagation within the channel waveguide, θ being greater than $\arcsin(\max\{n_a, n_c\}/n_s)$ for light diffracted by the channel waveguide to be captured by the auxiliary film waveguide, preventing diffraction towards the cladding and the substrate; wherein the auxiliary film and target film waveguides are located so as to allow the direct transfer of power from the auxiliary film waveguide to the target film waveguide; wherein the auxiliary film waveguide has a width configured to prevent the direct transfer of power from the channel waveguide to the target film waveguide.

16. The device according to claim 14, comprising: a plurality of the single-beam side deflectors as sections that are concatenated, wherein: the sections are concatenated in the direction of propagation of the signal through the channel waveguide, and a geometry of the channel waveguide is configured to shape at least one of an amplitude and a phase of a diffracted wave, the single-beam radiation condition being maintained in each section.

17. The device according to claim 14, further comprising: a modulator along the channel waveguide to modify the effective refractive index of the channel waveguide by means of one or more of thermo-optic modulators, electro-optic modulators, plasma dispersion modulators, or electro-acoustic modulators; wherein the deflector is configured for dynamically controlling, by means of the modulator provided, an angle used to diffract the single beam in the target film waveguide.

18. The device according to claim 17, comprising a plurality of concatenated modulator sections along the direction of propagation of the channel waveguide, each of said modulator sections having an electronic control signal for modifying at least one of an attenuation and an effective refractive index of the respective modulator section.

19. The device according to claim 14, further comprising a curved support on which the deflector is arranged for generating a beam which is focused inside the target film waveguide of the deflector; a plurality of receiver channel waveguides located at points of the target film waveguide in which the diffracted beam is focused for different wavelengths, such that by changing the working wavelength, the beam is predominantly focused in one of the receiver waveguides capturing the light; said output waveguides have an orientation that forms an angle θ with respect to the straight line normal to the curved support at the point where half of the diffracted total power has been diffracted, such that by changing the working wavelength, the beam is predominantly focused in one of the receiver waveguides capturing the light; said angle θ is greater than $\arcsin(\max\{n_a, n_c\}/n_s)$.

20. The device according to claim 14, further comprising a diffraction grating etched on the target film waveguide of the deflector; wherein the deflector and the diffraction grating are arranged for a generated beam to strike the diffraction grating.

* * * * *